US00RE50588E

(19) United States
(12) Reissued Patent
Nolting et al.

(10) Patent Number: US RE50,588 E
(45) Date of Reissued Patent: Sep. 16, 2025

(54) ION TRAPPING SCHEME WITH IMPROVED MASS RANGE

(71) Applicant: Thermo Fisher Scientific (Bremen) GmbH, Bremen (DE)

(72) Inventors: Dirk Nolting, Bremen (DE); Alexander A. Makarov, Bremen (DE); Amelia Corinne Peterson, Bremen (DE)

(73) Assignee: THERMO FISHER SCIENTIFIC (BREMEN) GMBH, Bremen (DE)

(21) Appl. No.: 18/206,463

(22) Filed: Jun. 6, 2023

Related U.S. Patent Documents

Reissue of:

(64) Patent No.: 11,515,138
Issued: Nov. 29, 2022
Appl. No.: 16/815,811
Filed: Mar. 11, 2020

(30) Foreign Application Priority Data

Mar. 14, 2019 (GB) ..... 1903474

(51) Int. Cl.
*H01J 49/42* (2006.01)

(52) U.S. Cl.
CPC ..... *H01J 49/4225* (2013.01); *H01J 49/426* (2013.01)

(58) Field of Classification Search
None
See application file for complete search history.

(56) References Cited

U.S. PATENT DOCUMENTS 4,771,172 A * 9/1988 Weber-Grabau ..... H01J 49/145 250/252.1
5,302,826 A * 4/1994 Wells ..... H01J 49/424 250/282
5,623,144 A * 4/1997 Yoshinari ..... H01J 49/424 250/281

(Continued)

FOREIGN PATENT DOCUMENTS

GB 2428515 A 1/2007

OTHER PUBLICATIONS

Dunn, Warwick B, Mass Spectrometry in Systems Biology: An Introduction, Methods in Enzymology, vol. 500, pp. 27-28 (Year: 2011).*

(Continued)

*Primary Examiner* — Lee E Sanderson

(74) *Attorney, Agent, or Firm* — Michael Best & Friedrich LLP

(57) ABSTRACT

Trapping ions in an ion trapping assembly is described. In one aspect, this is implemented by introducing ions into the ion trapping assembly, applying a first RF trapping amplitude to the ion trapping assembly so as to trap introduced ions which have m/z ratios within a first range of m/z ratios, and cooling the trapped ions. In some aspects, also performed is reducing the RF trapping amplitude from the first RF trapping amplitude to a second, lower, RF trapping amplitude so as to reduce the low mass cut-off of the ion trapping assembly and trapping, at the second, lower RF trapping amplitude, introduced ions having m/z ratios within a second range of m/z ratios. A lower mass limit of the second range of m/z ratios is below the low mass cut-off of the ion trapping assembly when the first RF trapping amplitude is applied.

53 Claims, 15 Drawing Sheets

(56) References Cited

U.S. PATENT DOCUMENTS 5,654,542 A * 8/1997 Schubert ..... H01J 49/428 250/282
5,729,014 A * 3/1998 Mordehai ..... H01J 49/4295 250/282
6,121,610 A 9/2000 Yoshinari et al. .... H01J 49/424 250/292
6,147,348 A * 11/2000 Quarmby ..... H01J 49/0063 250/282
6,870,158 B1 * 3/2005 Blain ..... H01J 49/0018 250/281
8,022,363 B2 * 9/2011 Iwamoto ..... H01J 49/4295 250/292
8,822,916 B2 * 9/2014 Guna ..... H01J 49/0031 250/282
2003/0136905 A1 * 7/2003 Franzen ..... H01J 49/062 250/292
2009/0194684 A1 8/2009 Guna et al.
2011/0062325 A1 * 3/2011 Mukaibatake ..... H01J 49/429 250/288
2013/0234014 A1 * 9/2013 Remes ..... H01J 49/0009 250/281
2014/0027628 A1 * 1/2014 Sutin ..... H01J 49/424 250/282
2015/0155149 A1 * 6/2015 Brown ..... H01J 49/0031 250/288
2015/0255263 A1 * 9/2015 Kodera ..... H01J 49/424 250/283
2016/0181084 A1 * 6/2016 Smith ..... H01J 49/429 250/282
2018/0323050 A1 * 11/2018 Smith ..... H01J 49/065

OTHER PUBLICATIONS

Combined Search and Examination report issued to GB1903474.3 dated Sep. 17, 2019.

* cited by examiner

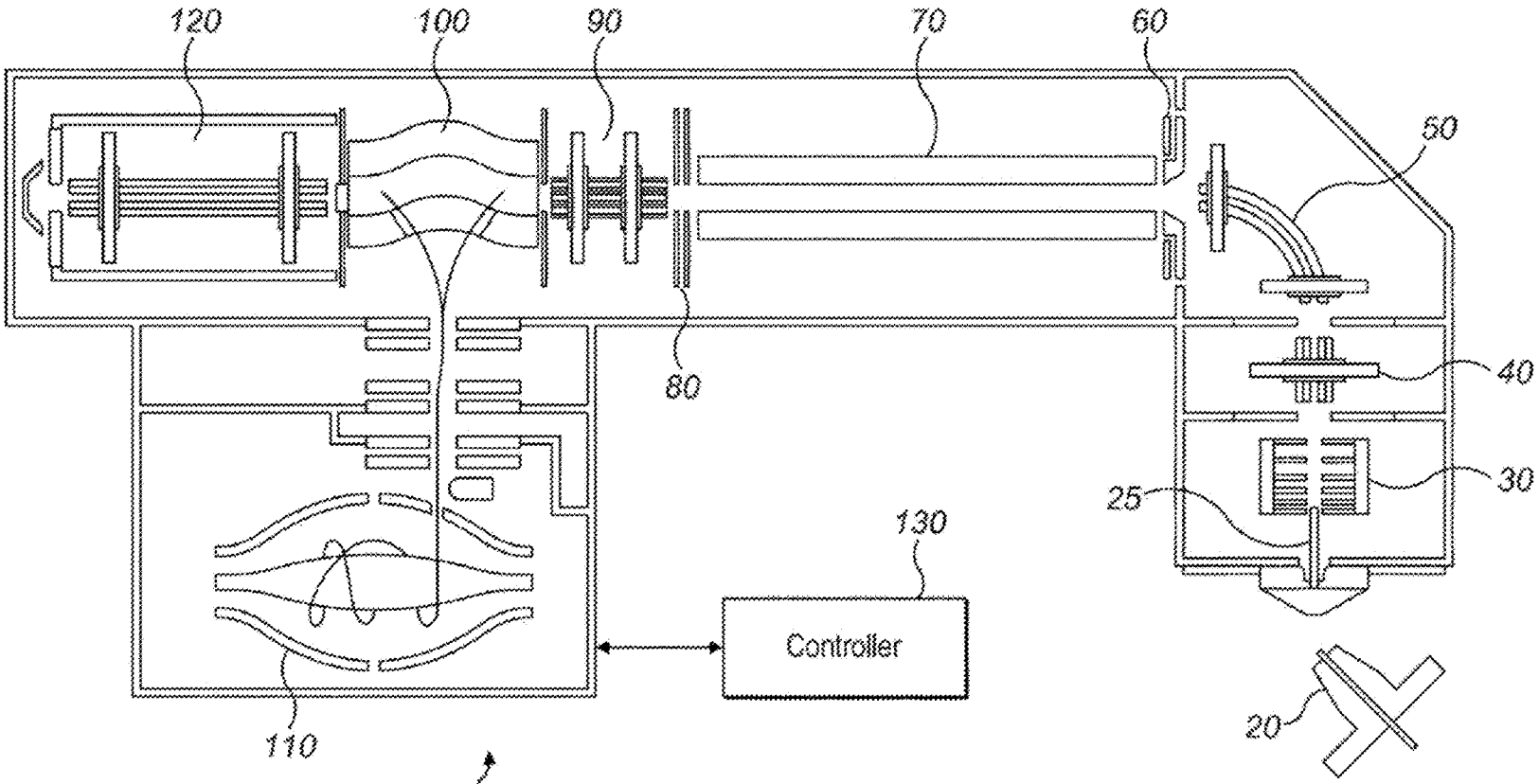
FIG. 2
AMENDED

ION TRAPPING SCHEME WITH IMPROVED MASS RANGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application claims the priority to GB Patent Application No. 1903474.3, filed on Mar. 14, 2019, which is hereby incorporated herein by reference in its entirety.] *This application is a reissue application of U.S. patent application Ser. No. 16/815,811, filed Mar. 11, 2020, now U.S. Pat. No. 11,515,138, which claims the priority to GB Patent Application No. 1903474, filed Mar. 14, 2019, which is hereby incorporated herein by reference in its entirety.*

FIELD OF THE INVENTION

This invention relates to trapping ions in an ion trapping assembly.

BACKGROUND

Mass spectrometry is an important technique for chemical analysis. In general, a mass spectrometer comprises an ion source for generating ions from a sample, various lenses, mass filters, ion traps/storage devices, and/or fragmentation device(s), and one or more mass analysers.

One important component of a mass spectrometer is the linear ion trap. One example of such a linear ion trap is a curved linear ion trap or C-trap, which stores/traps ions in a trapping volume using a potential well created by applying an RF potential to a set of curved, elongated rods (typically arranged as a quadrupole, hexapole or octapole).

One application of linear ion traps is as an intermediate storage device for ions prior to mass analysis. For example, a C-trap may be employed to store and inject ions into an orbital trapping mass analyser, such as the device marketed by Thermo Fisher Scientific, Inc., under the name Orbitrap®. These mass analysers have high mass accuracy and high mass resolution, and are thus increasingly used for detection of small organic molecules, such as in food and drugs analysis, metabolomics and anti-doping applications. Herein the term mass may be used to refer to the mass-to-charge ratio, m/z.

One of the challenges of a linear ion trap is the range of masses that can be trapped simultaneously. Ions are trapped in a linear trap by the application of RF voltages to the longitudinal electrodes to confine the ions radially whilst a static (DC) potential is applied to the end electrodes positioned at opposing axial ends of the longitudinal electrodes to confine the ions axially. The pseudopotential well created by a given applied RF voltage decreases in strength with increasing ion mass. However, higher mass ions have a similar kinetic energy to lower mass ions. Therefore, higher mass ions are more likely to have sufficient energy to escape the pseudopotential well created by the given applied RF trapping amplitude, and thus to be attenuated in the trap. Accordingly, higher mass ions have lower trapping efficiencies, thereby limiting the mass range of an ion trap. In practice, the ratio of highest trapped mass to lowest trapped mass is often limited to 15-20 in ion traps such as the C-trap.

It is desirable that the mass range trapped within the linear ion trap is as wide as possible. One way to define the mass range (that is, the range of m/z ratios) of ions in a linear ion trap is as the ratio of the highest mass to the lowest mass that can be trapped in the ion trap. For small molecule applications, a typical desired mass range may be 1200/15 (80), 1500/15 (100) or 2000/15 (133).

FIG. 1 is a plot of RF trapping amplitude (Volts peak-peak, Vpp) applied to the linear ion trap during injection and storage versus the relative intensity of ions trapped in the linear ion trap. For this plot, the same RF amplitude was applied to the linear ion trap for injection and storage. Each line of the plot represents a different mass of ions. It can be seen that higher mass ions have a lower intensity at lower RF amplitudes.

The present invention seeks to increase the trapping mass range of an ion trapping assembly such as a linear ion trap and particularly but not exclusively a curved linear ion trap (C-trap).

SUMMARY

In accordance with a first aspect of the present invention, there is provided a method of trapping ions in an ion trapping assembly.

The method comprises: (a) introducing ions into the ion trapping assembly, (b) applying a first RF trapping amplitude to the ion trapping assembly, so as to trap introduced ions which have m/z ratios within a first range of m/z ratios (c) cooling the trapped ions, (d) reducing the RF trapping amplitude from the first RF trapping amplitude to a second, lower, RF trapping amplitude so as to reduce the low mass cut-off of the ion trapping assembly and (e) trapping, at the second, lower RF trapping amplitude, introduced ions having m/z ratios within a second range of m/z ratios, wherein a lower mass limit of the second range of m/z ratios is below the low mass cut-off of the ion trapping assembly when the first RF trapping amplitude is applied.

This method improves the mass range (range of m/z ratios) of ions that are trapped in an ion trapping assembly. The ion trapping assembly may include an ion trap such as a C-trap or other linear ion trap. In a first stage of operation, higher mass ions are trapped by the application of a relatively higher RF trapping potential/amplitude. Although such a higher RF trapping potential/amplitude allows the capture of ions of relatively higher m/z, ions below a low mass cut-off are not trapped.

By cooling the ions prior to reducing the RF trapping amplitude to the second, lower RF trapping amplitude, the energy of ions within the ion trapping assembly is damped through collisions with inert gas molecules and the ions relax towards the bottom of the potential well. For example, the kinetic energy of an ion entering the ion trapping assembly is typically in the range of 1-200 eV, whereas the kinetic energy of such an ion after cooling is typically less than 100 meV (0.1 eV). The ions may be cooled so that they become thermalised in the trap. Accordingly, the pseudopotential well required for trapping ions upon injection is higher than that needed for subsequently storing cooled ions. The cooled higher mass ions remain within the ion trapping assembly when the RF amplitude is lowered, since they do not have sufficient kinetic energy to escape the potential well generated by the second, lower RF trapping amplitude.

The second, lower RF trapping amplitude applied in the second stage of operation of the ion trapping assembly results in a lower low mass cut-off than that resulting from the first, higher RF trapping amplitude applied in the first stage of operation of the ion trapping assembly. Thus, by lowering the RF trapping amplitude applied to the ion trapping assembly once the higher mass ions have been cooled, it is possible to introduce and trap ions of a lower mass into the ion trapping assembly, whilst at the same time retaining the higher mass ions because they have been cooled. In other words, the lower RF trapping amplitude generates an RF field that is sufficient to keep the cooled higher mass ions within the ion trapping assembly whilst at the same time allowing lower mass ions to be introduced and trapped within the same ion trapping assembly. This in turn increases the usable mass range of the ion trapping assembly relative to a method in which a single RF amplitude or an increasing RF amplitude is used to introduce and trap ions. By improving the mass range of ions that can be trapped together in an ion trapping assembly, a wider mass range of ions may be stored in the trap, compared with previous methods.

In some embodiments, the ion trapping assembly may be configured to eject the ions from the ion trapping assembly to a mass analyser that can mass analyse the ejected ions. The ions may be analysed thus in a mass scan by the analyser. A common scan type is a "full scan", which can be used as survey scan and should cover a mass range that is as wide as possible. The invention enables an increase in the usable mass range compared with previous methods and thus can improve one of the basic limitations of full scans where the ions have been trapped.

In some embodiments, the method may comprise applying n further RF trapping amplitudes, each being intermediate the first and second RF trapping amplitudes, to the ion trapping assembly, wherein $n \geq 1$, each of the n further RF trapping amplitudes causing introduced ions having a respective nth range of m/z ratios, each having lower mass limits, to be trapped; the method further comprising cooling the introduced ions which are trapped at a relatively higher RF trapping amplitude before reducing the RF trapping amplitude to a relatively lower trapping amplitude. This may be desirable as the change in RF trapping amplitude performed each time may be smaller.

In some embodiments, ions within a selected range of m/z ratios may be introduced into the ion trapping assembly from an upstream ion device, wherein the upstream ion device transmits ions within a selected range of m/z ratios. The method further comprising adjusting the upstream ion device to reduce a lower mass limit of the selected range of m/z ratios and reducing the RF trapping amplitude from the first RF trapping amplitude to the second, lower RF trapping amplitude in synchronism, or approximately in synchronism, with the reduction of the lower mass limit of the selected range m/z ratios of the upstream ion device.

By adjusting the mass transmission of an upstream ion device, it is possible to select ions within the first mass range upstream of the ion trapping assembly before the ions within the first mass range are then trapped by the ion trapping assembly. Therefore, the efficiency of the mass spectrometer may be improved.

Whilst the method adjusts the low mass cut-off of the ion trapping assembly by adjusting the RF trapping amplitude, it is also possible to adjust the low mass cut-off of the ion trapping assembly by adjusting the RF trapping frequency. Therefore, in accordance with a second aspect of the present invention, there is provided a method of trapping ions in an ion trapping assembly.

The method comprises (a) introducing ions into the ion trapping assembly; (b) applying a first RF trapping frequency to the ion trapping assembly so as to trap introduced ions which have m/z ratios within a first range of m/z ratios; (c) cooling the trapped ions; (d) increasing the RF trapping frequency from the first RF trapping frequency to a second RF trapping frequency so as to reduce the low mass cut-off of the ion trapping assembly; and (e) trapping, at the second RF trapping frequency, introduced ions having m/z ratios within a second range of m/z ratios; wherein a lower mass limit of the second range of m/z ratios is below the low mass cut-off of the ion trapping assembly when the first RF trapping frequency is applied.

Product ions generated by collisional dissociation typically have additional kinetic energy. Furthermore, the mass range of product ions generated from a precursor is wide, typically 100-(mz), where m is mass of the precursor ion and z is charge of the precursor ion (and (mz) is the product of mass of the precursor ion and charge of the precursor ion). Therefore, it is also desirable to improve the mass range (range of m/z ratios) of product ions that can be generated and trapped in an ion trapping assembly.

In accordance with a third aspect of the present invention, there is provided a method of trapping product ions in an ion trapping assembly configured to fragment ions. The method is advantageous, since it improves the mass range of product ions that can be generated and trapped in an ion trapping assembly, such as a fragmentation cell, a C-trap or other ion trap.

The method comprises (a) introducing precursor ions into the ion trapping assembly, (b) fragmenting the introduced precursor ions to generate product ions, (c) applying a first RF trapping amplitude to the ion trapping assembly, so as to trap product ions which have m/z ratios within a first range of m/z ratios, (d) cooling the trapped product ions, (e) reducing the RF trapping amplitude from the first RF trapping amplitude to a second, lower, RF trapping amplitude so as to reduce the low mass cut-off of the ion trapping assembly and (f) trapping, at the second, lower RF trapping amplitude, product ions having m/z ratios within a second range of m/z ratios, wherein a lower mass limit of the second range of m/z ratios is below the low mass cut-off of the ion trapping assembly when the first RF trapping amplitude is applied.

Product ions are generated from precursor ions introduced in the ion trapping assembly. This may occur continuously or intermittently. In a first stage of operation, higher mass product ions are trapped by the application of a relatively higher RF trapping potential/amplitude. Although such a higher RF trapping potential/amplitude allows the capture of ions of relatively higher m/z, ions below a low mass cut-off are not trapped.

By cooling the ions prior to reducing the RF trapping amplitude to the second, lower RF trapping amplitude, the energy of product ions within the ion trapping assembly is damped through collisions with inert gas molecules and the ions relax towards the bottom of the potential well. The product ions may be cooled so that they become thermalised in the ion trapping assembly. Accordingly, the pseudopotential well required for trapping product ions upon fragmentation is higher than that needed for subsequently storing cooled product ions. The cooled higher mass product ions remain within the ion trapping assembly when the RF trapping amplitude is lowered, since they do not have sufficient kinetic energy to escape the potential well generated by the second, lower RF trapping amplitude.

The second, lower RF trapping amplitude applied in the second stage of operation of the ion trapping assembly results in a lower low mass cut-off than that resulting from the first, higher RF trapping amplitude applied in the first stage of operation of the ion trapping assembly. Thus, by lowering the RF trapping amplitude applied to the ion trapping assembly once the higher mass product ions have been cooled, it is possible to trap product ions of a lower mass in the ion trapping assembly, whilst at the same time retaining the higher mass product ions because they have been cooled. In other words, the lower RF trapping amplitude generates an RF field that is sufficient to keep the cooled higher mass product ions within the ion trapping assembly whilst at the same time allowing lower mass product ions to be trapped within the same ion trap. This in turn increases the usable mass range of the ion trapping assembly relative to a method in which a single RF amplitude or an increasing RF amplitude is used to generate and trap product ions.

In accordance with a fourth aspect of the present invention, there is provided a controller for controlling trapping of ions in an ion trapping assembly.

In accordance with a fifth aspect of the present invention, there is provided a further controller for controlling trapping of ions in an ion trapping assembly.

In accordance with a sixth aspect of the present invention, there is provided a further controller for controlling fragmentation and trapping of ions in an ion trapping assembly.

In accordance with a seventh aspect of the present invention, there is provided an ion trapping assembly.

In accordance with an eighth aspect of the present invention, there is provided a mass spectrometer.

BRIEF DESCRIPTION OF THE DRAWINGS

The invention may be put into practice in a number of ways and some specific embodiments will now be described by way of example only and with reference to the accompanying drawings in which:

FIG. 2 is a schematic diagram of a first embodiment of a mass spectrometer with an ion trap in accordance with the present invention.

DETAILED DESCRIPTION

Figure 1:
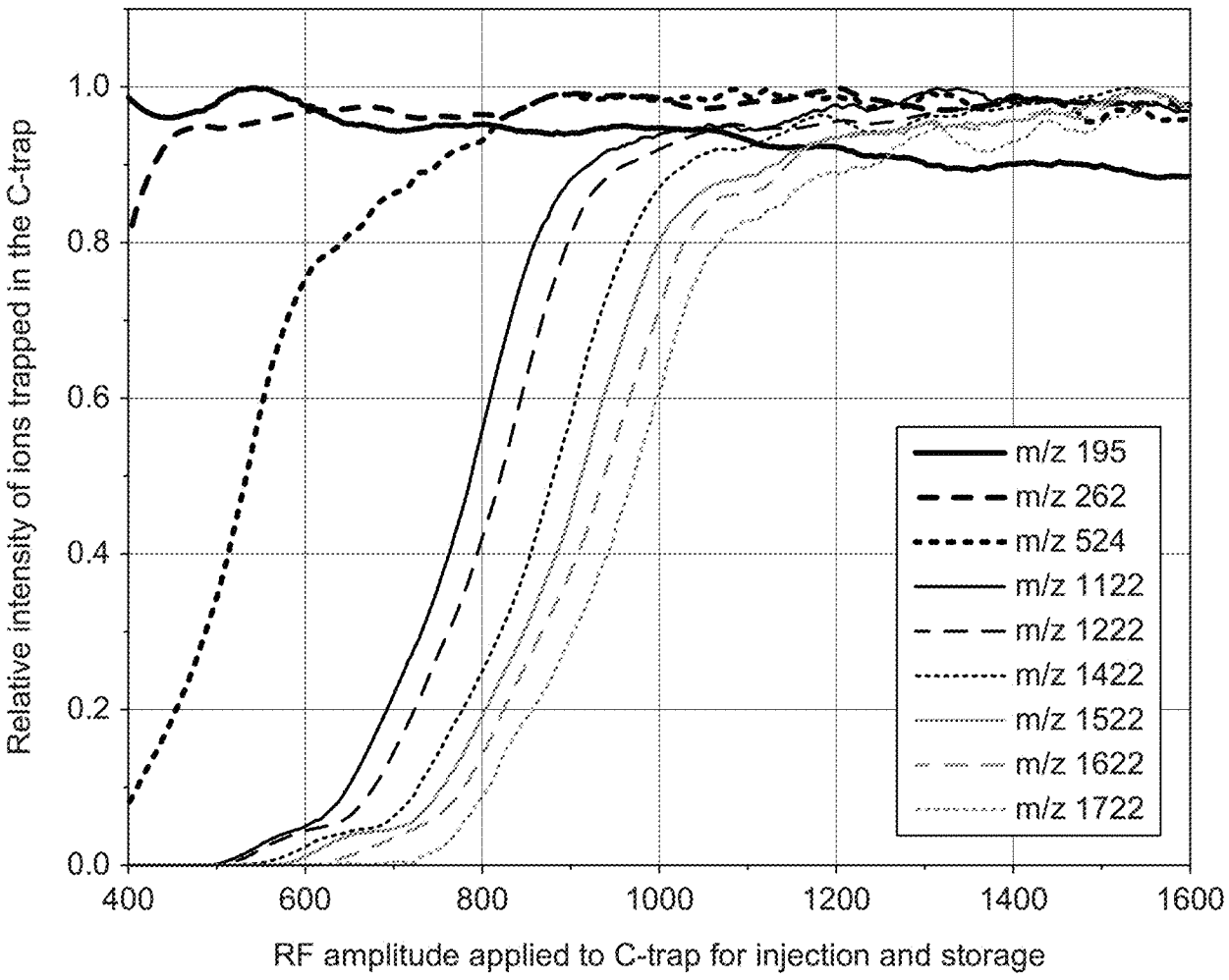
FIG. 1 is a plot of relative intensity of ions within an ion trap vs. RF Amplitude applied to the ion trap for injection and storage, in accordance with known methods.

FIG. 2 shows a schematic arrangement of a mass spectrometer 10 suitable for carrying out methods in accordance with embodiments of the present invention. The arrangement of FIG. 2 represents, schematically, the configuration of Thermo Fisher Scientific, Inc's Q Exactive® quadrupole-Orbitrap® mass spectrometer.

The mass spectrometer 10 includes an ion source 20 which generates gas-phase ions to be analysed. The ion source 20 is typically an electrospray ionisation source at atmospheric pressure. Those ions then enter a vacuum chamber of the mass spectrometer 10 and are directed by a capillary 25 into an S-lens 30.

The S-lens 30 is also known as the stacked ring ion guide (SRIG) or the RF Lens. The application of RF amplitudes to the S-lens 30 establishes an RF field that confines and focusses ions as they traverse the S-lens 30. The ions are focussed into an injection flatapole 40 which injects the ions into a bent flatpole 50. The bent flatapole 50 guides (charged) ions along a curved path through it whilst unwanted neutral molecules such as entrained solvent molecules are not guided along the curved path and are lost.

A TK lens 60 is located at the distal end of the bent flatapole 50. Ions pass from the bent flatapole 50 into a downstream quadrupole mass filter 70. The quadrupole mass filter 70 can be operated with a mass selection window such that the mass filter 70 extracts only those ions within a desired mass selection window that contains ions having those m/z ratios of interest (i.e. a window that contains the isotopes of interest). The mass filter is typically but not necessarily segmented and serves as a band pass filter. In some modes of operation, the quadrupole mass filter 70 may be operated in a substantially RF-only mode, so as to transmit as wide a mass range of ions as possible. This is used, for example, when a "full scan" is desired and the mass range should be as wide as possible.

Ions then pass through a quadrupole exit lens/split lens arrangement 80 that controls the passage of ions into a transfer multipole 90. The transfer multipole 90 guides the mass filtered ions from the quadrupole mass filter 70 into an ion trap, which is a curved trap (C-trap) 100. The C-trap 100 has an electrode assembly comprising longitudinally extending, curved rod electrodes which are supplied with RF voltages having RF trapping amplitudes, and end lenses to which DC voltages are supplied. The result is a potential well that extends along the curved longitudinal axis of the C-trap 100. The C-trap 100 stores ions in a trapping volume through application of the RF trapping amplitude to the rod electrodes (typically quadrupole, hexapole or octapole). In other words, the C-trap 100 can operate in an "RF only mode" for storage of ions i.e. there is no DC offset between the RF voltages. In some modes of operation, a small DC offset could be applied to the rod electrodes. In some embodiments, the C-trap may be replaced with a rectilinear ion trap having straight, longitudinally extending electrodes. C-traps employed according to embodiments of the present invention typically have an inscribed radius of 3 mm, a length of 25 to 30 mm, an ejection slot having a width of 0.8 mm and a length of 12 mm, an end aperture having a thickness of 1 mm and an inscribed diameter of 2-2.5 mm.

Cooled ions reside in a cloud towards the bottom of the potential well and are then ejected orthogonally from the C-trap 100 towards an orbital trapping device 110 such as the Orbitrap® mass analyser sold by Thermo Fisher Scientific, Inc. Ions exit the C-trap 100, for example by switching off the RF trapping voltage/amplitude and applying a DC pulse to one or more of the elongated longitudinal electrodes of the C-trap 100 to eject ions radially from the trap (for example push-pull DC voltages may be applied to elongated electrodes on opposite sides of the trap). The ions are injected into the orbital trapping device 110 through an off centre injection aperture as coherent packets-. Ions are then trapped within the orbital trapping device 110 by a hyperlogarithmic electric field, and undergo orbital motion in coherent packets around an inner electrode. As will be understood by the skilled reader, ion packets are detected through image currents and a mass spectrum is then obtained by fast Fourier transform.

Also shown in FIG. 2 is a fragmentation cell 120 that allows MS/MS analysis of ions to be carried out. The "dead end" configuration of the fragmentation chamber 120 in FIG. 2, wherein precursor ions are ejected axially from the C-trap 100 in a first direction towards the fragmentation chamber 120, and the resulting fragment ions are returned back to the C-trap 100 in the opposite direction, is described in further detail in WO-A-2006/103412.

The mass spectrometer 10 is under the control of a controller 130 which, for example, is configured to set the appropriate potentials on the electrodes of the quadrupole mass filter 70 so as to focus and filter the ions, to set appropriate voltages on the electrode assembly of the ion trap 100 to trap, store and eject the ions, to capture the mass spectral data from the orbital trapping device 110, control the sequence of MS1 and MS2 scans and so forth. It will be appreciated that the controller 130 may comprise a computer that may be operated according to a computer program comprising instructions to cause the mass spectrometer 10 to execute the steps of the method according to the present invention. The controller 130 may comprise trigger circuitry to start the application of RF trapping amplitudes to the electrode assembly of the ion trap 100. The controller 130 may comprise a clock for controlling a duration of time for which each RF trapping amplitude is applied to the electrode assembly of the ion trap 100. Information relating to the mass range of ions to be captured by the ion trap 100 can be input to the controller 130.

Figure 3:
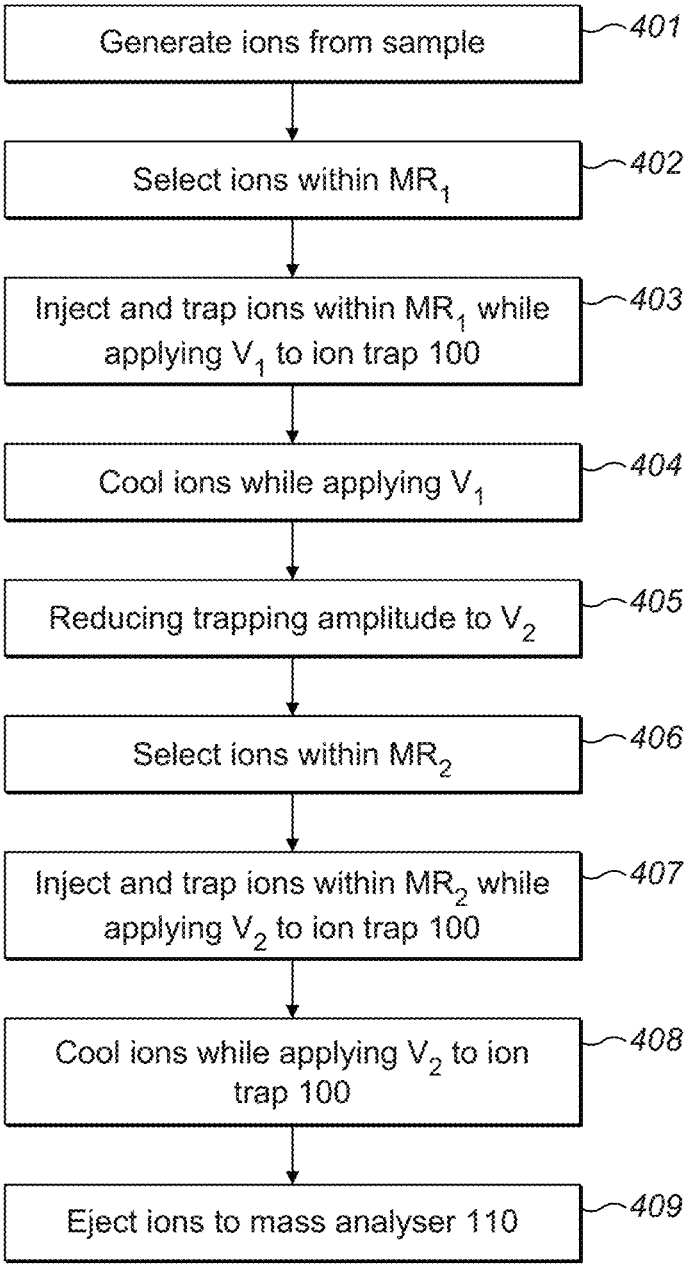
FIG. 3 shows a flowchart illustrating a method of operating the mass spectrometer of FIG. 2 in accordance with a first embodiment of the present invention.
Figure 4:
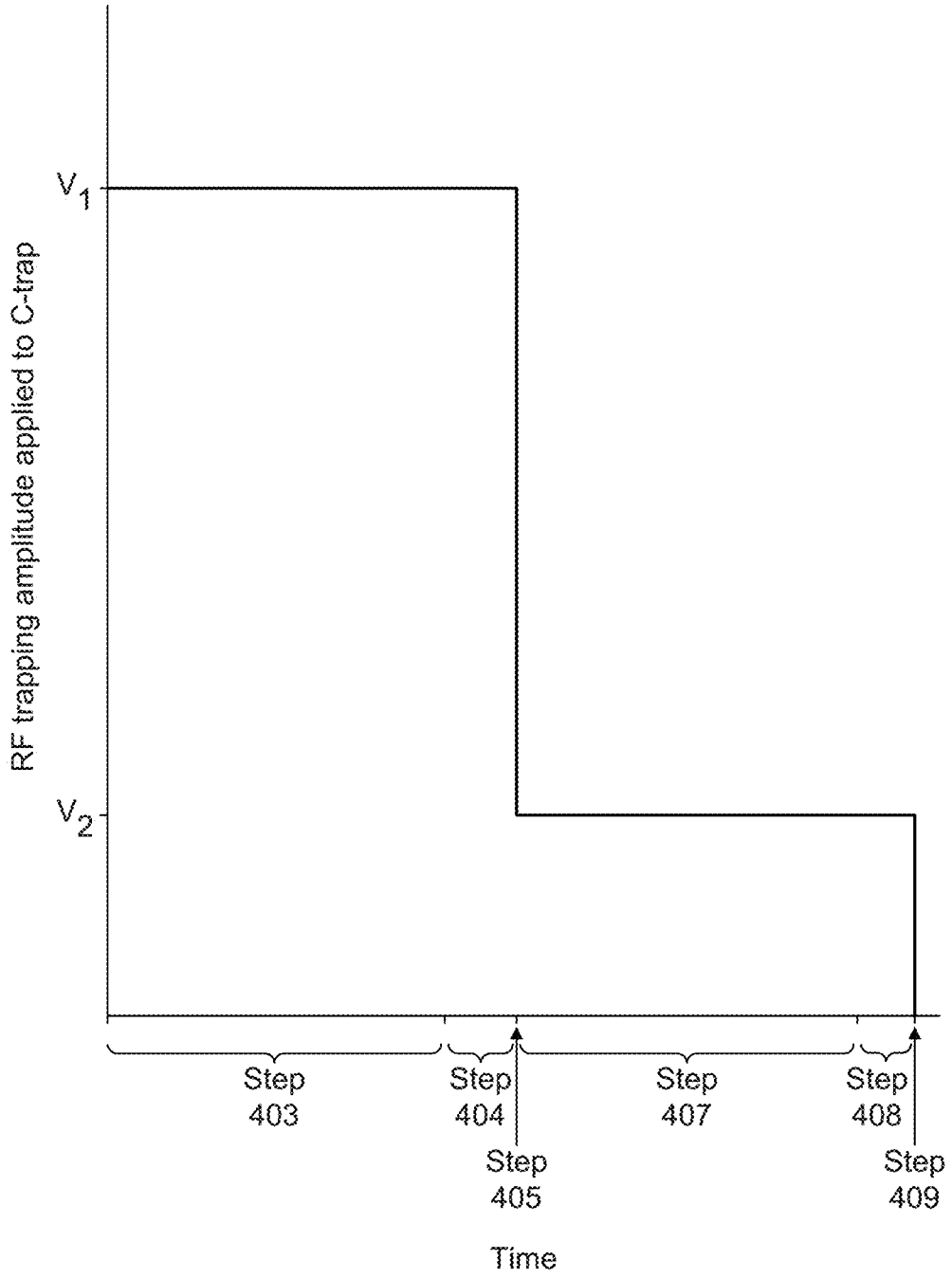
FIG. 4 is a schematic diagram of an RF trapping amplitude applied to the ion trap vs. time plot for the method depicted in FIG. 3.

An exemplary first embodiment of the method will now be described with reference to FIGS. 3 and 4. In the embodiment of FIGS. 3 and 4, the ion trapping assembly is the ion trap 100 of FIG. 2, which is a C-trap. However, it will be appreciated that in other embodiments the ion trapping assembly could, for example, be the fragmentation chamber 120.

In step 401, sample molecules are ionized using the ESI source 20. Sample ions subsequently enter the vacuum chamber of the mass spectrometer 10. The sample ions are directed through capillary 25 to the S-lens 30 downstream of the ion source.

In step 402, the ions are selected according to a first mass range (first range of m/z ratios) ($MR_1$). The first mass range ($MR_1$) has a lower mass limit and an upper mass limit. The mass filter 70 is set to a wide pass mode by the controller 130. The selection of ions is performed by an upstream ion device that transmits ions within the selected mass range. The upstream ion device may be, for example, one or more of the RF components of the mass spectrometer 10 upstream of the ion trap 100, such as the S-lens 30, injection flatapole 40 and bent flatapole 50. If so, the RF amplitude applied to one or more of the RF components is adjusted so that ions within the first mass range ($MR_1$) pass through the S-lens 30, the injection flatapole 40, bent flatapole 50, the quadrupole mass filter 70, the quadrupole exit lens/split lens arrangement 80 and through the transfer multipole 90 to the ion trap 100, as discussed above.

In step 403, the ions within the first mass range ($MR_1$) are introduced/injected into the ion trap 100 whilst a first RF amplitude ($V_1$) is applied to the ion trap 100 by the controller 130. Ions within the first mass range ($MR_1$) are trapped within the ion trap 100 by the potential well generated by the first RF amplitude ($V_1$). The potential well extends along the curved longitudinal axis of the ion trap, which is a C-trap 100. The first RF amplitude ($V_1$) is relatively high, for example, 950 V. The first RF trapping amplitude ($V_1$) is calculated based upon the lower mass limit of the first mass range ($MR_1$).

In step 404, the ions within the first mass range ($MR_1$) that are trapped in the ion trap 100 are cooled for a period of time. The trapped ions are cooled for a period of time sufficient for the trapped ions to reduce their kinetic energy so that they remain trapped on reducing the RF trapping amplitude. The period of time may be, for example, 6 ms. Whilst the ions are cooled, the controller 130 maintains the application of the first RF trapping amplitude ($V_1$) to the ion trap 100. The ions cool by virtue of collisions with inert gas within the ion trap 100 over the period of time. As a result of cooling, the kinetic energy of the ions is damped and they relax towards the bottom of the potential well. Typically, the ions become substantially thermalised in the ion trap by cooling.

In step 405, the RF trapping amplitude applied to the ion trap 100 is reduced from the first RF trapping amplitude ($V_1$) to a second, lower RF trapping amplitude ($V_2$). By reducing the RF trapping amplitude, the potential well created in the ion trap 100 has a lower potential barrier (the energy required for an ion to escape the potential well). However, as the ions within the first mass range have been cooled and their kinetic energy damped, these ions still do not have sufficient energy to overcome the potential barrier. Therefore, the ions within the first mass range ($MR_1$) remain trapped within the ion trap 100 on reducing the RF trapping amplitude. However, the second, lower RF amplitude ($V_2$) results in a lower low mass cut-off (LMCO) of the ion trap compared to the first RF trapping amplitude to enable lower mass ions to be trapped and stored.

In step 406, the selection of ions within the second mass range ($MR_2$) (second range of m/z ratios) is performed by the upstream ion device that transmits ions within the selected mass range. As discussed above, the upstream ion device may be, for example, one or more of the RF components of the mass spectrometer 10 upstream of the ion trap 100, such as the S-lens 30, the injection flatapole 40, and bent flatapole 50. If so, the RF amplitude applied to one or more of the RF components is reduced so that ions within the second mass range ($MR_2$) pass through the S-lens 30, the injection flatapole 40, bent flatapole 50, the quadrupole mass filter 70, the quadrupole exit lens/split lens arrangement 80 and through the transfer multipole 90 to the ion trap 100, as discussed above. The second mass range ($MR_2$) has a lower mass limit and an upper mass limit. The lower mass limit of the second mass range is below the low mass cut-off (LMCO) of the ion trap 100 when the first RF trapping amplitude ($V_1$) is applied.

In step 407, the ions within the second mass range ($MR_2$) are introduced/injected whilst the controller 130 maintains application of the second, lower RF trapping amplitude ($V_2$). The ions within the second mass range ($MR_2$) are trapped within the ion trap by the potential well generated by the second RF trapping amplitude ($V_2$). Ions within the first mass range ($MR_1$) have been sufficiently cooled in step 404 such that they do not have enough kinetic energy to escape the potential well created by the second RF trapping amplitude ($V_2$). Therefore, the ions within the first mass range ($MR_1$) remain trapped within the ion trap 100.

In step 408, the ions within the ion trap 100 are cooled for a period of time whilst the application of the second RF amplitude to the ion trap is maintained by the controller 130. The cooled ions reside in a cloud towards the bottom of the potential well.

In step 409, the RF trapping amplitude applied to the ion trap 100 may be switched off and DC pulses may be applied to the ion trap 100 to cause both the ions within the first mass range ($MR_1$) and the ions within the second mass range ($MR_2$) to be ejected from the ion trap 100 and into to the orbital trapping mass analyser 110. The ejection of ions from an ion trap is well known.

In one example, the following RF amplitudes may be applied for selection and trapping of ions within the first mass range ($MR_1$) (steps 402 and 403 of FIGS. 3 and 4), the first mass range ($MR_1$) having a lower mass limit of 155 m/z:

The RF amplitude applied to the S-Lens (30) may be 98 V;

The RF amplitude applied to the injection Flatapole 40 may be 25 V;

The RF amplitude applied to the quadrupole mass filter 70 may be 44 V; and

The RF amplitude applied to the ion trap (C-trap) 100 may be 950 V.

The following RF amplitudes may be applied for selection and trapping of ions within the second mass range ($MR_2$) (steps 406 and 407 of FIGS. 3 and 4), the second mass range ($MR_2$) having a lower mass limit of 40 m/z:

The RF amplitude applied to the S-Lens (30) may be 51 V;

The RF amplitude applied to the injection Flatapole 40 may be 25 V;

The RF amplitude applied to the quadrupole mass filter 70 may be 44 V; and

The RF amplitude applied to the ion trap (C-trap) 100 may be 400 V.

FIG. 4 is a plot of RF trapping amplitude vs time for the method depicted in FIG. 3. In FIG. 4, the first RF trapping amplitude ($V_1$) and second RF trapping amplitude ($V_2$) are applied for the same duration of time. Accordingly, the injection and trapping of ions within the first mass range ($MR_1$) and the ion trapping and injection of ions within the second mass range ($MR_2$) occur for the same duration of time. Therefore, the intensities of ions measured for the first mass range ($MR_1$) are in proportion with the intensities of ions measured for the second mass range ($MR_2$). Accordingly, the mass spectrum obtained by the mass analyser 110 is not distorted. As shown in FIG. 4, the reduction in RF trapping amplitude from the first RF trapping amplitude ($V_1$) to the second RF trapping amplitude ($V_2$) is performed discontinuously, i.e. as a step change.

Whilst the method shown in FIGS. 3 and 4 has been described for two different mass ranges, it is possible to perform the invention using three, four, five or more different mass ranges. Indeed, the method can include applying n further RF trapping amplitudes to the ion trap 100, n being one or more. Each of the RF trapping amplitudes can be between the first and second RF trapping amplitudes. Each of the introduced ions having a respective nth mass range (range of m/z ratios) will be trapped by application of n further trapping amplitudes to the ion trap 100. The controller 130 maintains the current RF trapping amplitude for a period of time sufficient for the ions within the ion trap 100 to cool before reducing the RF trapping amplitude to a relatively lower trapping amplitude. The trapped ions are cooled for a period of time sufficient for the trapped ions to reduce their kinetic energy so that they remain trapped on reducing the RF trapping amplitude.

For example, the first and second RF trapping amplitudes ($V_1$, $V_2$) may be the same as those employed in the method of the first embodiment. Therefore, the mass range of ions ultimately trapped within the ion trap 100 will be the same as in the first embodiment. However, each of the n further RF trapping amplitudes may be intermediate RF trapping amplitudes i.e. between those first and second RF trapping amplitudes ($V_1$, $V_2$). This arrangement is discussed in further detail with regard to FIGS. 5 and 6. In this arrangement, instead of reducing the RF trapping amplitude directly from the first to the second trapping amplitude, the RF trapping amplitude is reduced stepwise via the intermediate RF trapping amplitudes. Therefore, the change in RF trapping amplitude performed each time is smaller.

Alternatively, the n further RF trapping amplitudes may be employed to increase the mass range of ions ultimately trapped within the ion trap 100 compared to the method of the first embodiment. For example, one or more of the n further RF trapping amplitudes may not be between the first and second RF trapping amplitudes. One or more of the n further RF trapping amplitudes may be greater than the first RF trapping amplitude ($V_1$). Accordingly, by applying that greater RF trapping amplitude before reducing the RF trapping amplitude to the first RF trapping amplitude ($V_1$), it would be possible to trap ions having a higher mass than the upper mass limit of the first mass range ($MR_1$). Alternatively, or additionally, one or more of the n further RF trapping amplitudes may be lower than the second RF trapping amplitude ($V_2$). By applying that lower RF trapping amplitude, the low mass cut-off of the ion trap 100 will be reduced. Accordingly, by reducing the RF trapping amplitude to that lower RF trapping amplitude after applying the second RF trapping voltage ($V_2$), it would be possible to trap ions having a lower mass than the low mass cut-off of the ion trap (100) when the second RF trapping amplitude ($V_2$) is applied.

In addition to applying an RF trapping amplitude(s) greater than $V_1$ and/or less than $V_2$, one or more RF trapping amplitudes may also be applied between $V_1$ and $V_2$, as discussed above.

An exemplary second embodiment of the method will now be described with reference to FIGS. 5 and 6 in which ions are introduced and trapped in the ion trap 100 of FIG. 2, which is a C-trap. The second embodiment of the method requires five different mass ranges and five corresponding RF trapping amplitudes.

Steps 601, 602, 603 and 604 are the same as steps 401, 402, 403 and 404 of FIG. 3, respectively.

In step 605, the RF trapping amplitude applied to the ion trap 100 is reduced from the first RF trapping amplitude ($V_1$) to a third, relatively lower RF trapping amplitude ($V_3$).

In step 606, ions are selected according to a third mass range ($MR_3$) (third range of m/z ratios) having a lower mass limit and an upper mass limit. The lower mass limit of the third range of m/z ratios is below the low mass cut-off of the ion trap 100 when the first RF trapping amplitude ($V_1$) is applied. The low mass cut-off (LMCO) of the ion trap 100 when the third RF trapping amplitude is applied is lower than the low mass cut-off of the ion trap 100 when the first RF trapping amplitude ($V_1$) is applied.

In step 607, the ions within the third mass range ($MR_3$) are introduced/injected and trapped within the ion trap whilst the controller 130 maintains application of the third RF trapping amplitude ($V_3$).

In step 608, the ions within the ion trap are cooled for a period of time whilst the application of the third RF trapping amplitude ($V_3$) to the ion trap is maintained by the controller 130.

In step 609, the RF trapping amplitude applied to the ion trap 100 is reduced from the third RF trapping amplitude ($V_3$) to a fourth, relatively lower RF trapping amplitude ($V_4$).

In step 610, ions are selected according to a fourth mass range ($MR_4$) (fourth range of m/z ratios) having a lower mass limit and an upper mass limit. The lower mass limit of the fourth range of m/z ratios is below the LMCO of the ion trap 100 when the third RF trapping amplitude ($V_3$) is applied. The LMCO of the ion trap 100 when the fourth RF trapping amplitude ($V_4$) is applied is lower than the LMCO of the ion trap 100 when the third RF trapping amplitude ($V_3$) is applied.

In step 611, the ions within the fourth mass range ($MR_4$) are introduced/injected and trapped within the ion trap whilst the controller 130 maintains application of the fourth RF trapping amplitude ($V_4$).

In step 612, the ions within the ion trap are cooled for a period of time whilst the application of the fourth RF trapping amplitude ($V_4$) to the ion trap is maintained by the controller 130.

In step 613, the RF trapping amplitude applied to the ion trap is reduced from the fourth RF trapping amplitude to a fifth, relatively lower RF trapping amplitude ($V_5$).

In step 614, ions are selected according to a fifth mass range ($MR_5$) (fifth range of m/z ratios) having a lower mass limit and an upper mass limit. The fifth mass range ($MR_5$) has lower and upper mass limits. The lower mass limit of the fifth range of m/z ratios is below the LMCO of the ion trap 100 when the fourth RF trapping amplitude ($V_4$) is applied. The LMCO of the ion trap 100 when the fifth RF trapping amplitude ($V_5$) is applied is lower than the LMCO of the ion trap 100 when the fourth RF trapping amplitude ($V_4$) is applied.

In step 615, the ions within the fifth mass range ($MR_5$) are introduced/injected and trapped in the ion trap whilst the controller 130 maintains application of the fifth RF trapping amplitude ($V_5$).

In step 616, the ions within the ion trap 100 are cooled for a period of time whilst the application of the fifth RF trapping amplitude ($V_5$) to the ion trap 100 is maintained by the controller 130.

In step 617, the RF trapping amplitude applied to the ion trap is reduced from the fifth RF trapping amplitude ($V_5$) to the second, relatively lower RF trapping amplitude ($V_2$).

In step 618, the ions are selected according to the second mass range ($MR_2$) having a lower mass limit and an upper mass limit, similarly to step 406. The lower mass limit of the second range of m/z ratios is below the LMCO of the ion trap (100) when the fifth RF trapping amplitude ($V_5$) is applied. The LMCO of the ion trap (100) when the second RF trapping amplitude ($V_2$) is applied is lower than the LMCO of the ion trap 100 when the fifth RF trapping amplitude ($V_5$) is applied.

In step 619, the ions within the second mass range ($MR_2$) are introduced/injected and trapped in the ion trap whilst the controller 130 maintains application of the second, lower RF trapping amplitude ($V_2$).

In step 620, the ions within the ion trap 100 are cooled for a period of time whilst the application of the second RF trapping amplitude ($V_2$) to the ion trap 100 is maintained by the controller 130.

In step 621, the RF trapping amplitude applied to the ion trap 100 may be switched off and DC pulses may be applied to the ion trap 100 to cause the ions within the first, second, third, fourth and fifth mass ranges ($MR_1$, $MR_2$, $MR_3$, $MR_4$, $MR_5$) to be ejected from the ion trap 100 and into to the orbital trapping mass analyser 110. The ejection of ions from an ion trap 100 is well known.

Steps 605, 609, 613 and 617 are similar to step 405 of FIG. 3. By reducing the RF trapping amplitude, the potential well created in the ion trap 100 has a lower potential barrier. However, as the ions within the ion trap have been cooled and their kinetic energy damped, these ions still do not have sufficient energy to overcome the potential barrier. Therefore, the ions remain trapped within the ion trap 100 on reducing the RF trapping amplitude.

Steps 606, 610, 614 and 618 are similar to step 406 of FIG. 3. The selection of ions is performed by an upstream ion device. The upstream ion device may be, for example, one or more of the RF components of the mass spectrometer 10 upstream of the ion trap 100, such as the S-lens 30. If so, the RF amplitude applied to one or more of the RF components is adjusted so that ions within the selected mass range pass through the S-lens 30, the injection flatapole 40, bent flatapole 50, the quadrupole mass filter 70, the quadrupole exit lens/split lens arrangement 80 and through the transfer multipole 90 to the ion trap 100, as discussed above.

Steps 607, 611, 615 and 619 are similar to step 407 of FIG. 3.

Steps 608, 612, 616 and 620 are similar to step 404 of FIG. 3. By cooling the trapped ions before reducing the RF trapping amplitude, the cooled ions do not have enough kinetic energy to escape the potential well generated by the relatively lower RF trapping amplitude. Therefore, the trapped ions remain trapped within the ion trap 100.

Figure 5:
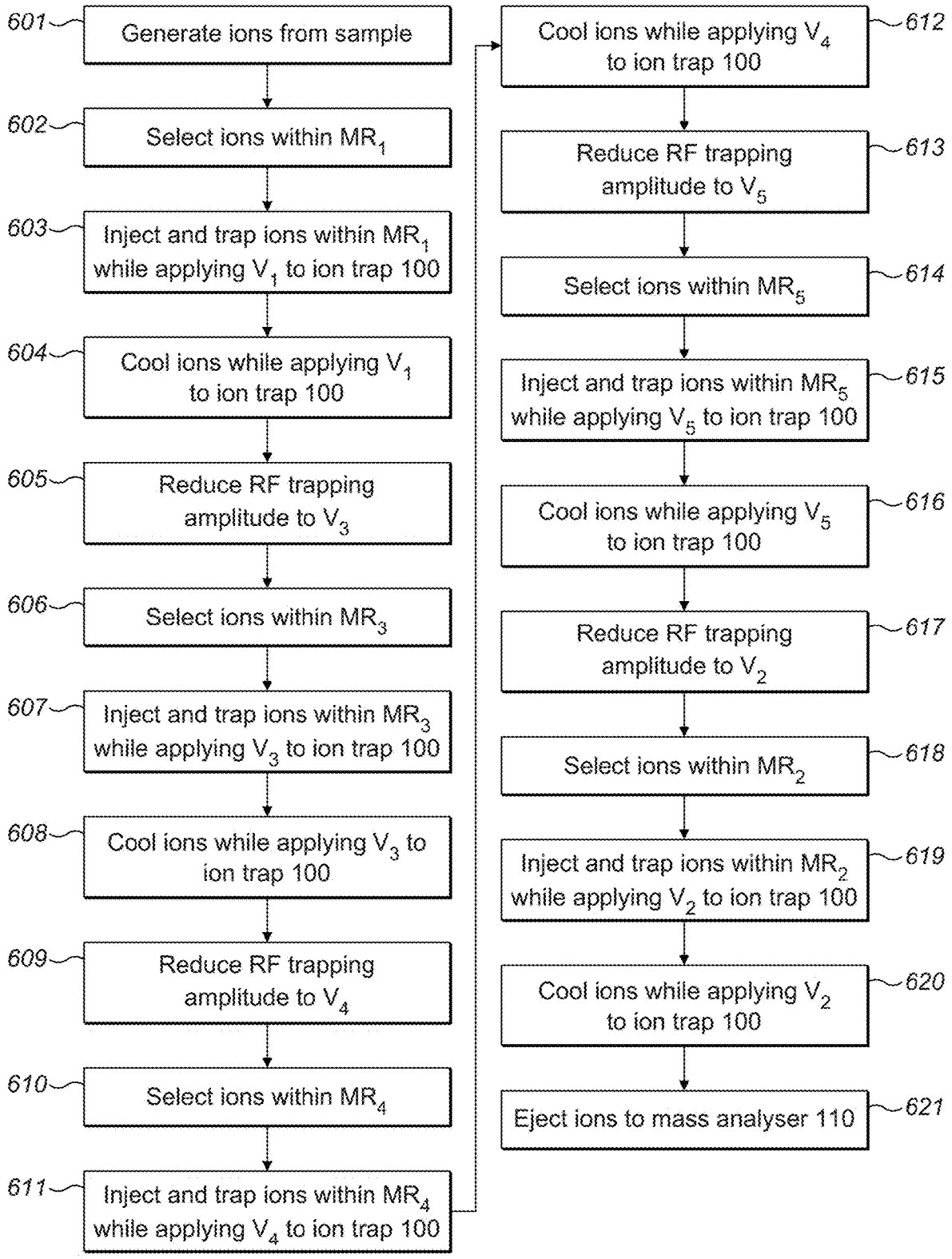
FIG. 5 shows a flowchart illustrating a method of operating the mass spectrometer of FIG. 2 in accordance with a second embodiment of the present invention.
Figure 6:
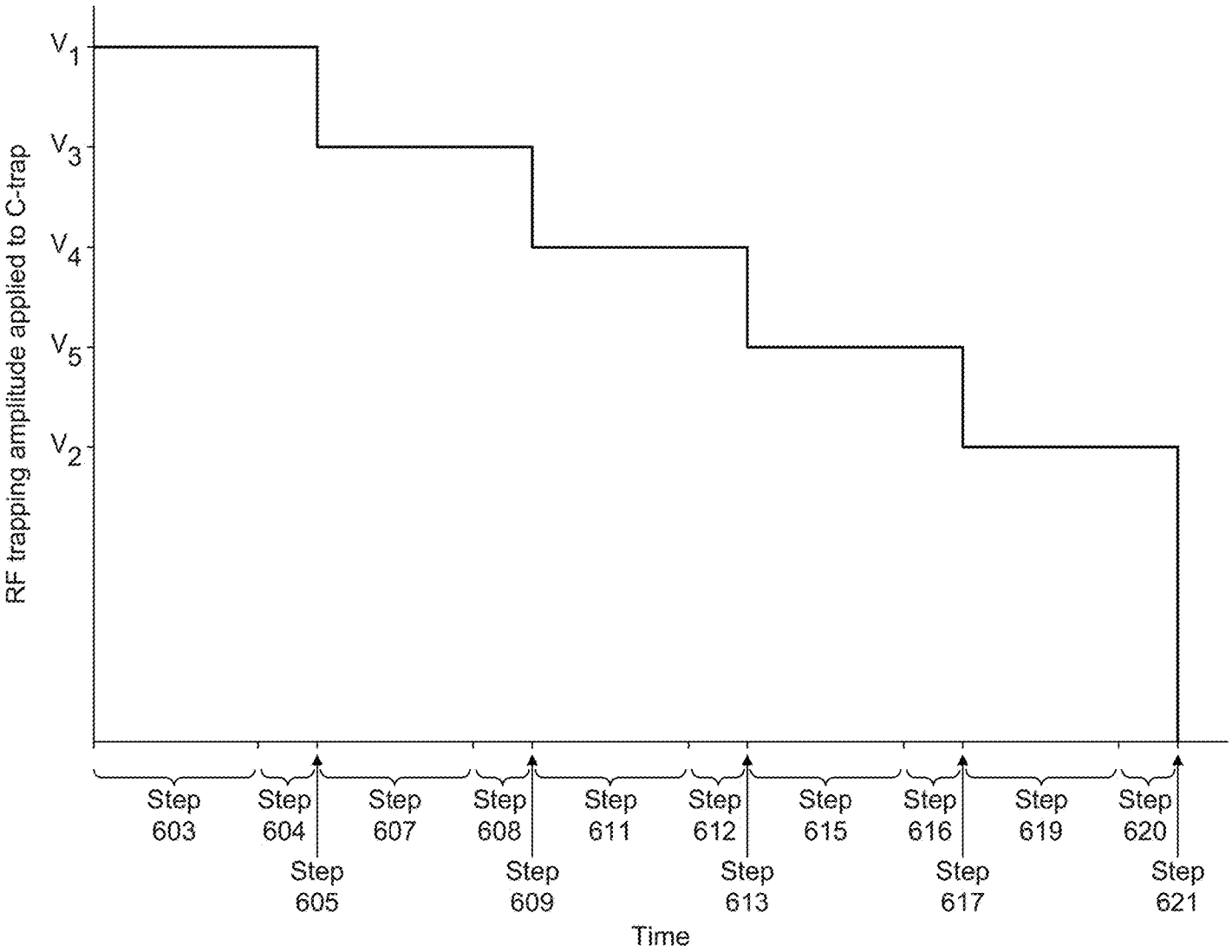
FIG. 6 is a schematic diagram of an RF trapping amplitude applied to the ion trap vs. time plot for the method depicted in FIG. 5.

FIG. 6 is a plot of RF trapping amplitude vs time for the method depicted in FIG. 5. In FIG. 6, each of the first, second, third, fourth and fifth RF trapping amplitudes ($V_1$, $V_2$, $V_3$, $V_4$, $V_5$) are applied for the same duration of time. Accordingly, the injection and trapping of ions within each mass range occurs for the same duration of time. Therefore, the intensities of ions measured for each mass range are in proportion with each other. As shown in FIG. 6, each reduction in RF trapping amplitude is performed discontinuously. In FIG. 6, each of the third, fourth and fifth RF trapping amplitudes ($V_3$, $V_4$, $V_5$) are equally spaced between the first and second RF trapping amplitudes ($V_1$, $V_2$).

As discussed above, FIG. 1 is a plot of RF amplitude applied during injection and storage vs intensity of ions within a C-trap, in accordance with prior art methods. For this plot, the same RF amplitude was applied to a C-trap for injection and trapping of ions. Each line of the plot represents a different mass of ions. It can be seen that higher mass ions have a lower intensity at lower RF trapping amplitudes. As discussed in the background section above, this is because the pseudopotential created by a certain RF voltage decreases in strength with increasing mass.

Figure 7:
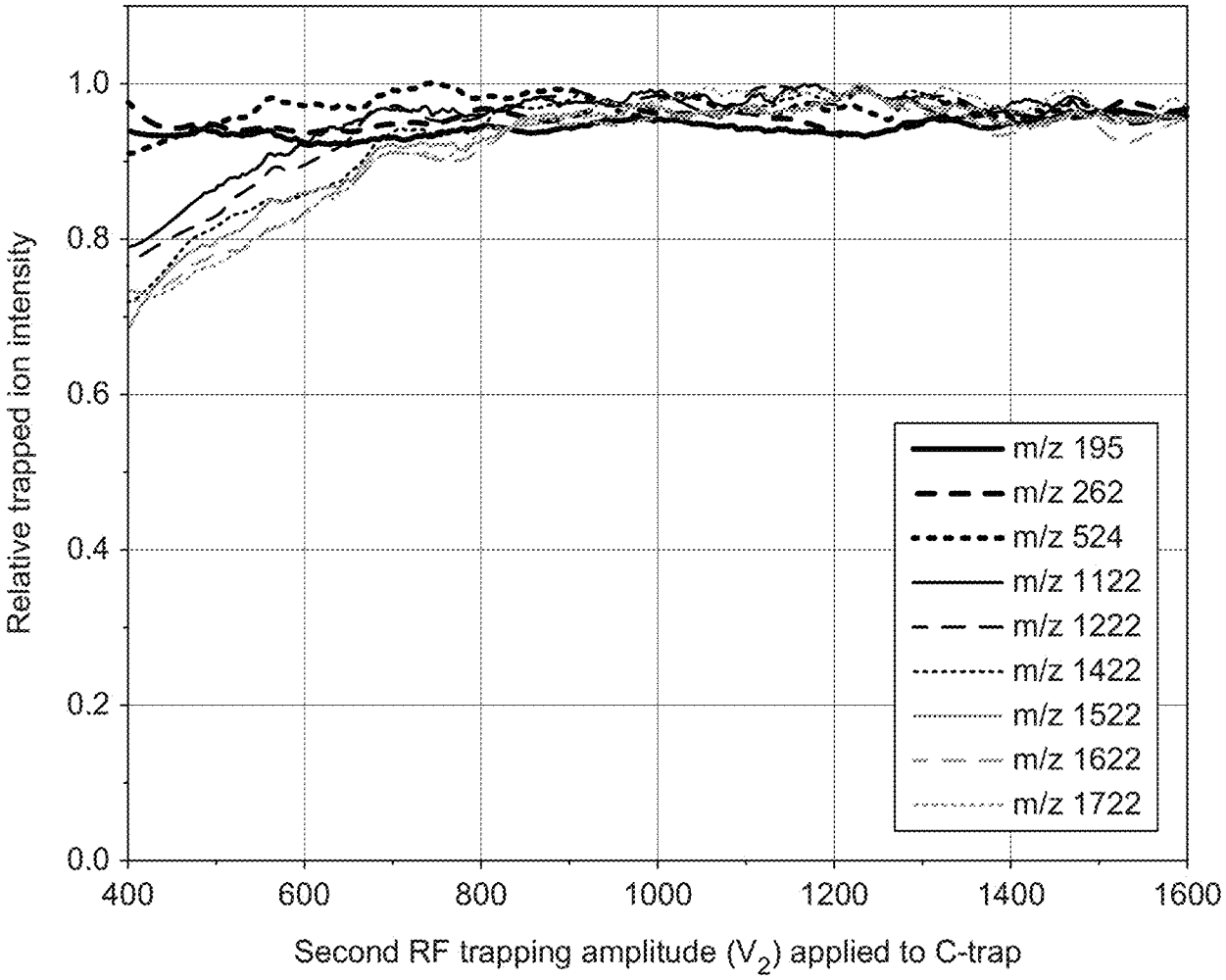
FIG. 7 is a plot of relative intensity of ions vs. second RF trapping amplitude applied to the ion trap, in accordance with the first embodiment of the present invention.\

FIG. 7 is a plot of second RF trapping amplitude ($V_2$) applied to the C-trap 100 vs intensity of ions, in accordance with the method of the first embodiment of the present invention. For this plot, ions were introduced and trapped in the C-trap 100 at a first RF trapping amplitude ($V_1$) of 1500 V. The ions were then cooled. Subsequently, the RF trapping amplitude was reduced to a certain second RF trapping amplitude ($V_2$) (as indicated on the x-axis of the plot) before ejection of the ions from the C-trap 100. Each line represents a different mass of ions. Comparing FIGS. 1 and 7, by trapping higher mass ions (such as m/z 1722) at a relatively high RF trapping amplitude (1500 V) and cooling them before storing at a lower RF trapping amplitude (such as 500 V), their intensity is greater than that achieved by trapping and storing those higher mass ions at a single RF trapping amplitude (such as 500 V). FIG. 7 also confirms that the pseudopotential well depth required for trapping ions is indeed greater than the pseudopotential well depth required for storing ions, i.e. after the ions have cooled.

Figure 8:
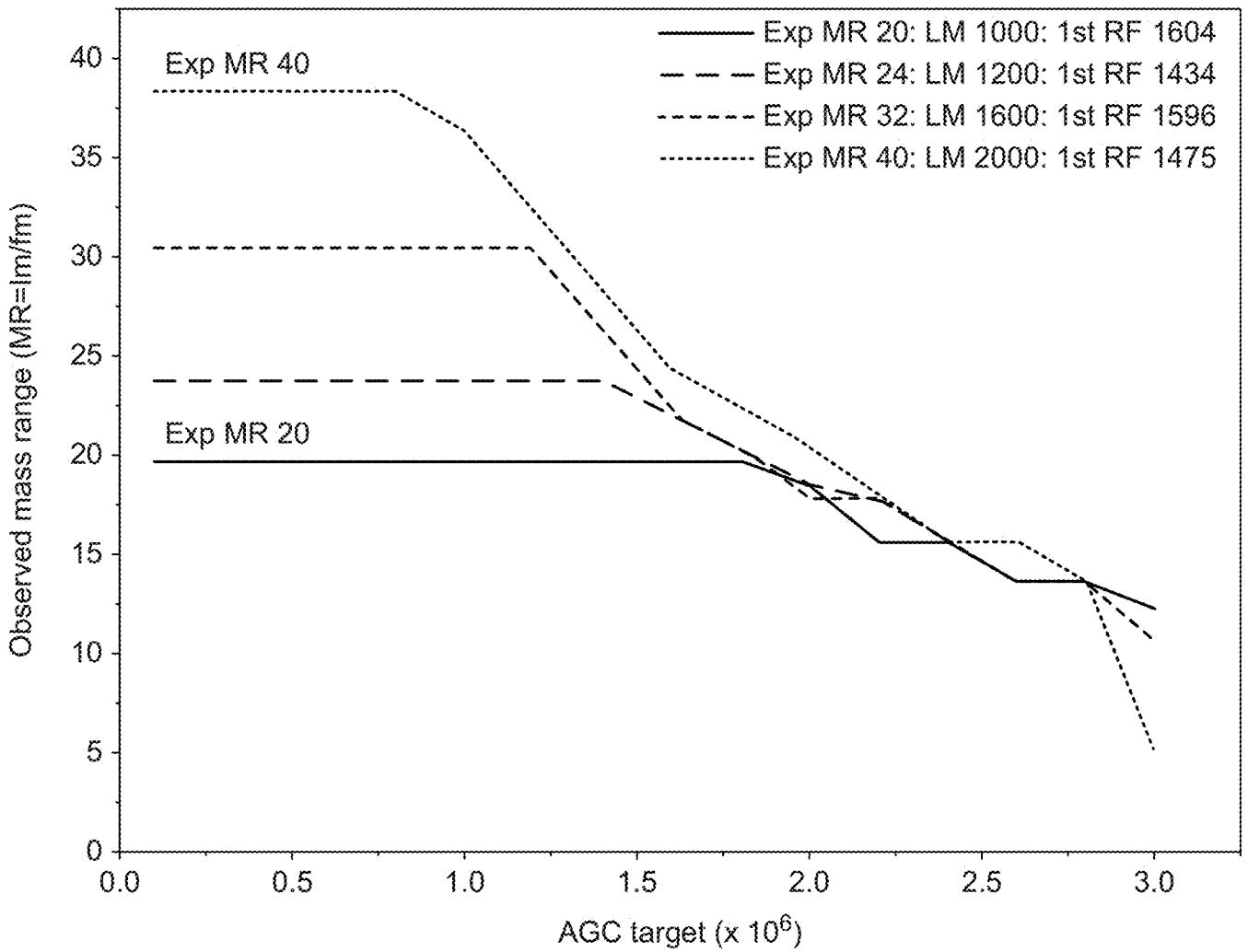
FIG. 8 is a plot of observed trapped mass range (MR) vs. automatic gain control (AGC) target, i.e. target number of trapped ions, obtained using a calibration sample (Calmix).

FIG. 8 is a plot of observed trapped mass range (MR) vs. automatic gain control (AGC) target, i.e. target number of trapped ions, obtained using a calibration sample (Calmix). Calmix comprises a solution of caffeine (m/z 195), MRFA peptide (m/z 524) and Ultramark polymer (m/z 1122, 1222, . . . 1722). MR is the ratio of the highest (last) mass (lm)/lowest (first) mass (fm) trapped in the ion trap. AGC target represents the space charge (ion population) within the ion trap. In the plot, the expected MR (Exp. MR) given the RF settings is labelled for comparison with the experimentally observed values. The second RF trapping amplitude applied to the ion trap in all measurements was 300 V, corresponding to a first mass (fm) of 40. FIG. 8 shows that for a given expected mass range, above a threshold, the observed trapped mass range (MR) decreases as ion population increases in the ion trap. FIG. 8 thus shows a dependence of trapped mass range (using multiple RFs during trapping according to the invention) on space charge and that the dependence is different for different mass ranges (different RF settings). Since the mass ranges of trapped ions depend on the first and second RF amplitudes and/or first and second RF frequencies applied to the ion trap, in embodiments, a total number of trapped ions in the ion trap is kept below a threshold determined as a function of the first and second RF trapping amplitudes and/or first and second RF trapping frequencies applied to the ion trap, for example as a function of a ratio of first and second RF trapping amplitudes and/or first and second RF trapping frequencies. Accordingly, FIG. 8 indicates how a user could balance the competing necessities of the widest mass range against the highest signal-to-noise ratio (S/N) in spectrum. The latter is very important for depth of analysis and quantitation. For example, if the desired mass range is 40, then the ion population may be $1\times10^6$. In contrast, if a mass range of only 30 is required, then the ion population may be increased further to $1.25\times10^6$ and the S/N of trace components could be improved.

Figure 9A:
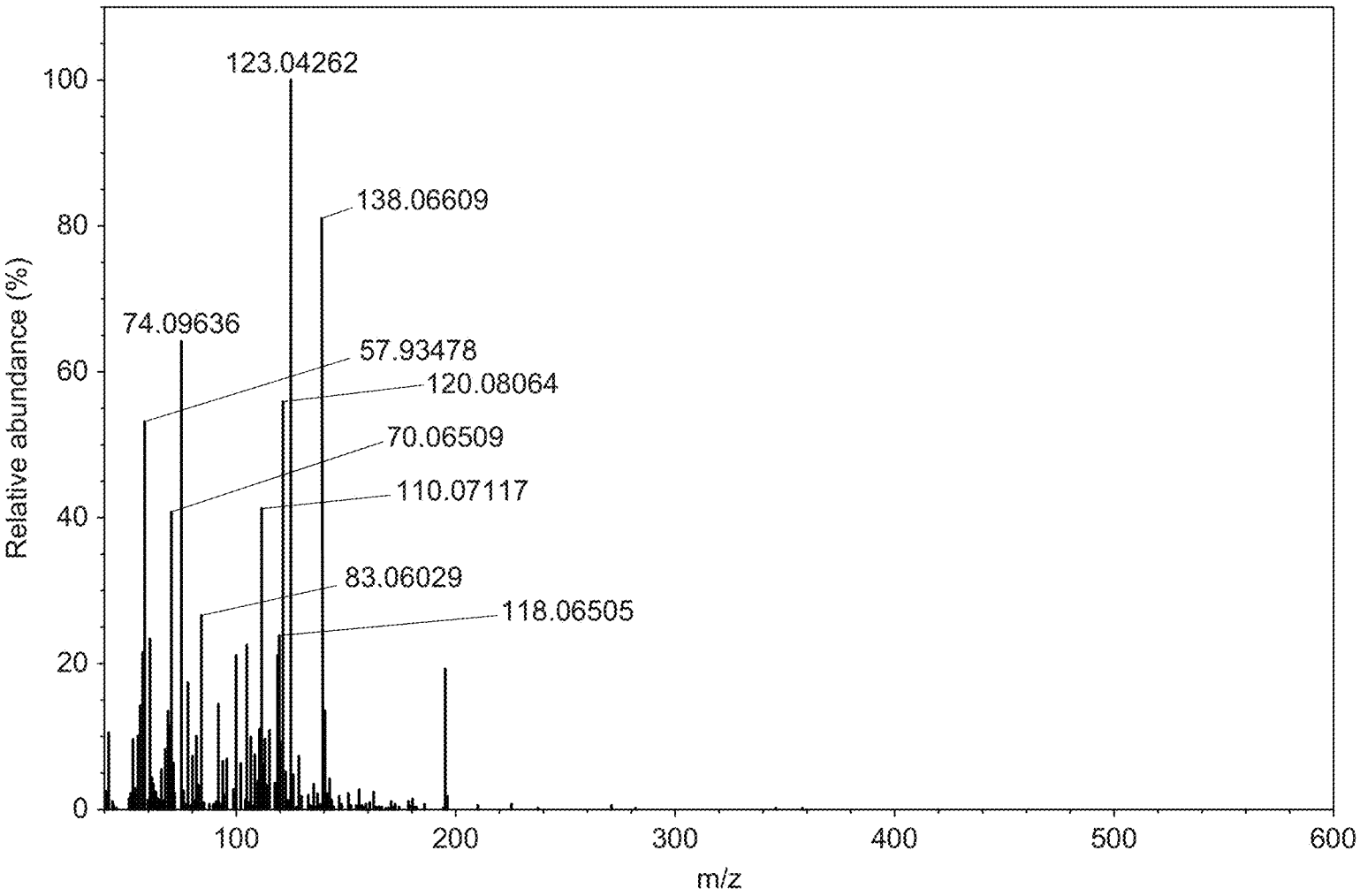
FIG. 9(a) is a mass spectrum obtained using a calibration sample (Calmix) and a single RF amplitude, in accordance with prior art methods.
Figure 9B:
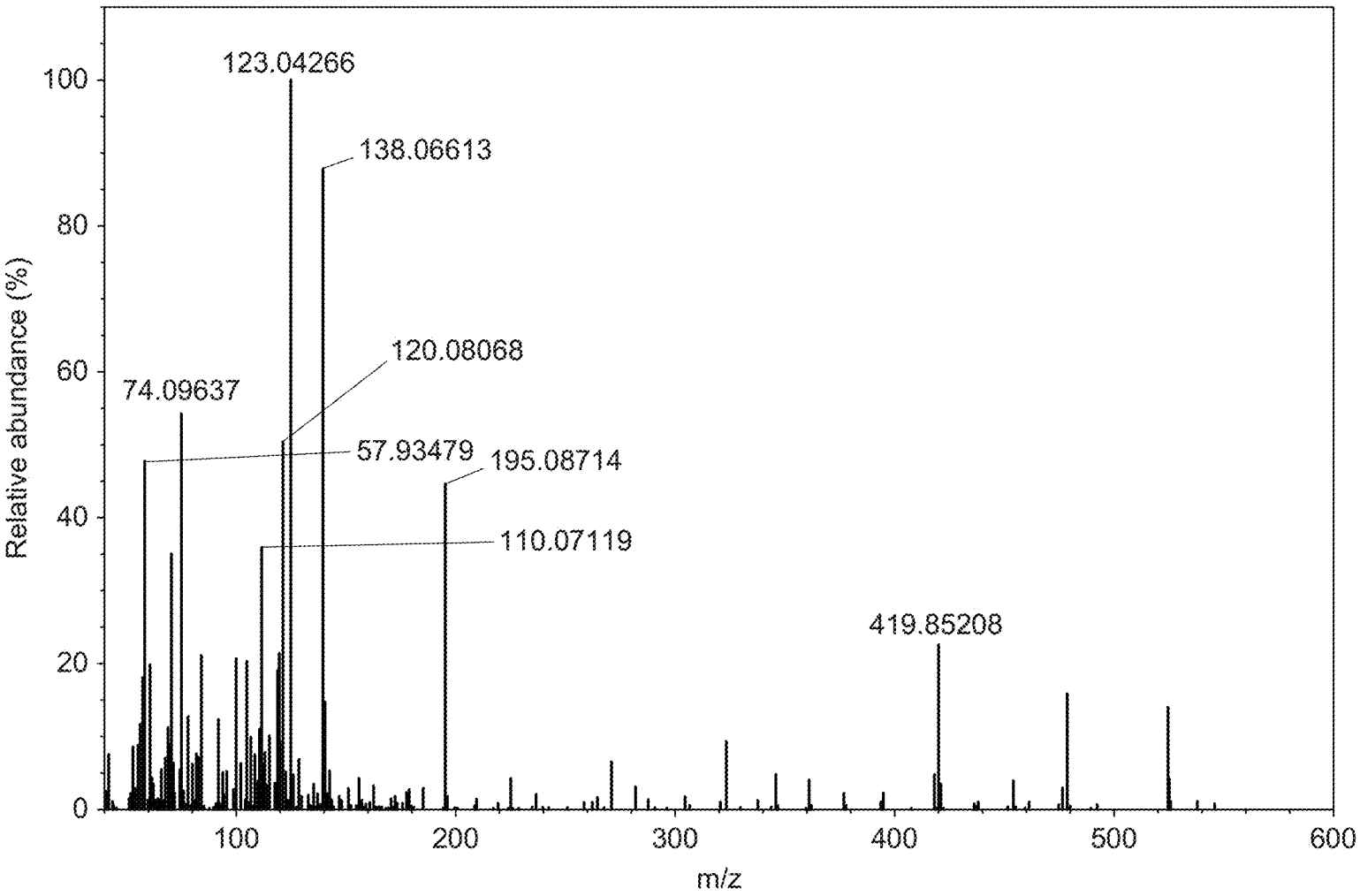
FIG. 9(b) is a mass spectrum obtained using a calibration sample (Calmix) and different first and second RF amplitudes, in accordance with the first embodiment of the present invention.

FIGS. 9(a) and 9(b) demonstrate that the methods of the present invention achieve an increased usable mass range for an ion trap. FIG. 9(a) depicts a mass spectrum of a sample obtained using prior art methods whereby the injection and trapping of ions is performed at a single RF trapping amplitude (300V) using the calibration sample Calmix, which is discussed above. FIG. 9(b) depicts a mass spectrum of the same sample as FIG. 9(a) acquired in accordance with the methods of the present invention where the first RF trapping amplitude ($V_1$) is 1000 V and the second RF trapping amplitude ($V_2$) is 300 V. The time period to change the electronics to reduce the RF trapping amplitude from the first RF trapping amplitude ($V_1$) to the second RF trapping amplitude ($V_2$) could be 0.5 to 2 ms. The ions were collisionally cooled during the time taken to change the electronics to reduce RF trapping amplitude and also within a similar time frame to the time required to change the electronics (several ms). It can be seen that in FIG. 9(a), the mass spectrum includes ions up to m/z=200 i.e. the higher mass ions have been attenuated. In FIG. 9(b), the mass spectrum includes ions up to m/z=540 i.e. ions of higher mass have been trapped and so detected by the mass analyser 110. Accordingly, the methods of the present invention increase the usable mass range of the ion trap 100.

Whilst the method employed in FIGS. 3 to 6 has been described in relation to a single ion trap, in a particularly advantageous embodiment of the invention, multiple ion traps and/or ion cooling devices may be employed in the ion trapping assembly.

An exemplary third embodiment of the method will now be described with reference to FIGS. 10 and 11 employing a ion cooling device (fragmentation cell 120 of FIG. 2) and an ion trap (ion trap 100 of FIG. 2, which is a C-trap). The fragmentation cell 120 comprises an RF trapping device, such as an RF multipole, so that the fragmentation cell 120 can be operated in accordance with the invention. The fragmentation cell 120 is operated at a higher pressure than the ion trap 100 and in a low fragmentation mode (low fragmentation including a mode without fragmentation).

In step 1001, sample molecules are ionized using the ESI source 20. Sample ions subsequently enter the vacuum chamber of the mass spectrometer 10. The sample ions are directed through capillary 25 to the S-lens 30 downstream of the ion source.

In step 1002, the ions are selected according to a first mass range (first range of m/z ratios) ($MR_1$). The first mass range ($MR_1$) has a lower mass limit and an upper mass limit. The mass filter 70 is set to a wide pass mode by the controller 130. The selection of ions is performed by an upstream ion device that transmits ions within the selected mass range. The upstream ion device may be, for example, one or more of the RF components of the mass spectrometer 10 upstream of the ion trap 100, such as the S-lens 30, injection flatapole 40 and bent flatapole 50. If so, the RF amplitude applied to one or more of the RF components is adjusted so that ions within the first mass range ($MR_1$) pass through the S-lens 30, the injection flatapole 40, bent flatapole 50, the quadrupole mass filter 70, the quadrupole exit lens/split lens arrangement 80 and through the transfer multipole 90 to the ion trap 100, as discussed above.

In step 1003, the ions within the first mass range ($MR_1$) are introduced/injected into the ion trap 100. The introduced ions within the first mass range ($MR_1$) pass through the ion trap 100 to the fragmentation cell 120 whilst the first RF trapping amplitude ($V_1$) is applied to the fragmentation cell 120 and a first corresponding RF trapping amplitude ($V_1$) is applied to the ion trap 100 by the controller 130. The first corresponding RF trapping amplitude is applied to the ion trap 100 by the controller 130 such that the low mass cut-off of the ion trap 100 is the same as the low mass cut-off of the fragmentation cell in step 1003. The ion trap 100 functions as an ion guide such that the ions within the first mass range ($MR_1$) are not trapped within the ion trap 100 but are transmitted through the ion trap 100 to the fragmentation cell 120. The controller 130 may control the RF trapping amplitude applied to the ion trap 100 independently of the RF trapping amplitude applied to the fragmentation cell 120. Alternatively, the RF trapping amplitude may simultaneously control the RF trapping amplitude applied to the fragmentation cell 120 and the ion trap 100. In step 1003, the ions within the first mass range ($MR_1$) are transferred to the fragmentation cell 120 with minimal additional energy such that fragmentation of the transferred ions is prevented. Indeed, the difference in DC voltage applied to the ion trap 100 and to the fragmentation cell 120 is minimised in order to prevent fragmentation during transfer. For example, the DC offset for the ion trap 100 may be 0 V and the DC offset for the fragmentation cell 120 may be −2 V. In step 1003, once transferred to the fragmentation cell 120, the ions within the first mass range ($MR_1$) are trapped in the fragmentation cell 120 by the potential well generated by the first RF trapping amplitude ($V_1$) applied to the fragmentation cell 120. The first RF trapping amplitude ($V_1$) is relatively high, for example, 950 V. The first RF trapping amplitude ($V_1$) is calculated based upon the lower mass limit of the first mass range ($MR_1$).

In step 1004, the ions within the first mass range ($MR_1$) that are trapped in the fragmentation cell 120 are cooled for a period of time within the fragmentation cell 120 whilst the first RF trapping amplitude ($V_1$) is applied to the fragmentation cell 120. The first corresponding RF trapping amplitude may optionally be applied to the ion trap 100 during step 1004.

In step 1005, the ions within the first mass range ($MR_1$) trapped within the fragmentation cell 120 are transferred from the fragmentation cell 120 to the ion trap 100 whilst the first RF trapping amplitude ($V_1$) is applied to the fragmentation cell 120 and the first corresponding RF trapping amplitude is applied to the ion trap 100. The ions within the first mass range ($MR_1$) are transferred to the ion trap 100 with minimal additional energy such that fragmentation of the transferred ions is prevented.

In step 1006, the ions within the first mass range ($MR_1$) that have been transferred back to the ion trap 100 are trapped in the ion trap 100 by the potential well generated by the first corresponding RF trapping amplitude applied to the ion trap 100. The first RF trapping amplitude ($V_1$) may optionally be applied to the fragmentation cell 120 during step 1006.

In step 1007, the ions within the first mass range ($MR_1$) that have been transferred back to and trapped in the ion trap 100 are cooled for a period of time within the ion trap 100 whilst the first corresponding RF trapping amplitude is applied to the ion trap 100. The trapped ions are cooled for a period of time sufficient for the trapped ions to reduce their kinetic energy so that they remain trapped on reducing the RF trapping amplitude. The period of time may be, for example, 6 ms. Whilst the ions are cooled, the controller 130 maintains the application of the first corresponding RF trapping amplitude ($V_1$) to the ion trap 100. The ions cool by virtue of collisions with inert gas within the ion trap 100 over the period of time. As a result of cooling, the kinetic energy of the ions is damped and they relax towards the bottom of the potential well. Typically, the ions become substantially thermalised in the ion trap 100 by cooling. The first RF trapping amplitude ($V_1$) may optionally be applied to the fragmentation cell 120 during step 1007.

In step 1008, the RF trapping amplitude applied to the ion trap 100 is reduced from the first corresponding RF trapping amplitude ($V_1$) to a second, lower RF trapping amplitude ($V_2$). By reducing the RF trapping amplitude, the potential well created in the ion trap 100 has a lower potential barrier (the energy required for an ion to escape the potential well). However, as the ions within the first mass range have been cooled and their kinetic energy damped, these ions still do not have sufficient energy to overcome the potential barrier. Therefore, the ions within the first mass range ($MR_1$) remain trapped within the ion trap 100 on reducing the RF trapping amplitude. However, the second, lower RF amplitude ($V_2$) results in a lower low mass cut-off (LMCO) of the ion trap 100 compared to the first RF trapping amplitude to enable lower mass ions to be trapped and stored. The RF trapping amplitude applied to the fragmentation cell 120 may be controlled independently to the RF trapping amplitude applied to the ion trap. For example, the RF trapping amplitude applied to the fragmentation cell 120 may be maintained at the first RF trapping amplitude ($V_1$) during step 1008. Alternatively, in step 1008, the RF trapping amplitude applied to the fragmentation cell 120 may be reduced in synchronism with the RF trapping amplitude applied to the ion trap 100. For example, in the step 1008, the RF trapping amplitude applied to the fragmentation cell 120 may be reduced from the first RF trapping amplitude ($V_1$) to a second corresponding RF trapping amplitude. The low mass cut-off of the fragmentation cell 120 when the second corresponding RF trapping amplitude is applied to the fragmentation cell 120 is the same as the low mass cut-off of the ion trap 100 when the second RF trapping amplitude ($V_2$) is applied to the ion trap 100.

In step 1009, the selection of ions within the second mass range ($MR_2$) (second range of m/z ratios) is performed by the upstream ion device that transmits ions within the selected mass range. As discussed above, the upstream ion device may be, for example, one or more of the RF components of the mass spectrometer 10 upstream of the ion trap 100, such as the S-lens 30, the injection flatapole 40, and bent flatapole 50. If so, the RF amplitude applied to one or more of the RF components is reduced so that ions within the second mass range ($MR_2$) pass through the S-lens 30, the injection flatapole 40, bent flatapole 50, the quadrupole mass filter 70, the quadrupole exit lens/split lens arrangement 80 and through the transfer multipole 90 to the ion trap 100, as discussed above. The second mass range ($MR_2$) has a lower mass limit and an upper mass limit. The lower mass limit of the second mass range is below the low mass cut-off (LMCO) of the ion trap 100 when the first RF trapping amplitude ($V_1$) is applied.

In step 1010, the ions within the second mass range ($MR_2$) are introduced/injected to the ion trap 100 whilst the controller 130 maintains application of the second, lower RF trapping amplitude ($V_2$). The ions within the second mass range ($MR_2$) are trapped within the ion trap 100 by the potential well generated by the second RF trapping amplitude ($V_2$). Ions within the first mass range ($MR_1$) have been sufficiently cooled in step 1007 such that they do not have enough kinetic energy to escape the potential well created by the second RF trapping amplitude ($V_2$). Therefore, the ions within the first mass range ($MR_1$) remain trapped within the ion trap 100.

In step 1011, the ions within the ion trap 100 are cooled for a period of time whilst the application of the second RF amplitude to the ion trap 100 is maintained by the controller 130. The cooled ions reside in a cloud towards the bottom of the potential well. The cooling of ions within the ion trap 100 may occur by collisions between the trapped ions within the first mass range ($MR_1$) and the trapped ions within the second mass range ($MR_2$).

In step 1012, the RF trapping amplitude applied to the ion trap 100 may be switched off and DC pulses may be applied to the ion trap 100 to cause both the ions within the first mass range ($MR_1$) and the ions within the second mass range ($MR_2$) to be ejected from the ion trap 100 and into to the orbital trapping mass analyser 110. The ejection of ions from an ion trap 100 is well known. Accordingly, trapped ions within the first mass range ($MR_1$) and trapped ions within the second mass range ($MR_2$) may both be analysed together to generate a single mass spectrum having a mass range spanning both the first and second mass ranges ($MR_1$, $MR_2$).

The low mass cut-off of an ion trap or fragmentation cell depends on the RF trapping amplitude applied thereto and on the inscribed radii of the ion trap/fragmentation cell. In the embodiment of FIG. 10, the ion trap 100 and the fragmentation cell 120 have the same low mass cut-off when the same RF trapping amplitude is applied thereto. Therefore, in the embodiment of FIG. 10, the first corresponding RF trapping amplitude and the first RF trapping amplitude ($V_1$) are the same. Similarly, in the embodiment of FIG. 10, the second corresponding RF trapping amplitude and the second RF trapping amplitude ($V_2$) are the same. In an alternative embodiment, the ion trap 100 and the fragmentation cell 120 may have different inscribed radii. In such an embodiment, to achieve the same low mass cut-off for the ion trap 100 as for the fragmentation cell 120, different RF trapping amplitudes need to be applied thereto. Accordingly, the first corresponding RF trapping amplitude and the first RF trapping amplitude ($V_1$) would be different. Similarly, the second corresponding RF trapping amplitude and the second RF trapping amplitude ($V_2$) would be different.

Typically, the ion trap (ion trap 100) is held at lower pressure than the ion cooling device (fragmentation cell 120), e.g. at least 1 or at least 2 orders of magnitude lower pressure. More generally, pressure in the fragmentation cell 120 multiplied by length of the fragmentation cell 120, is significantly higher than the pressure of the ion trap 100 multiplied by the length of the ion trap 100. This ensures efficient trapping and transfer of high-m/z ions such as intact proteins or protein complexes.

Figure 10:
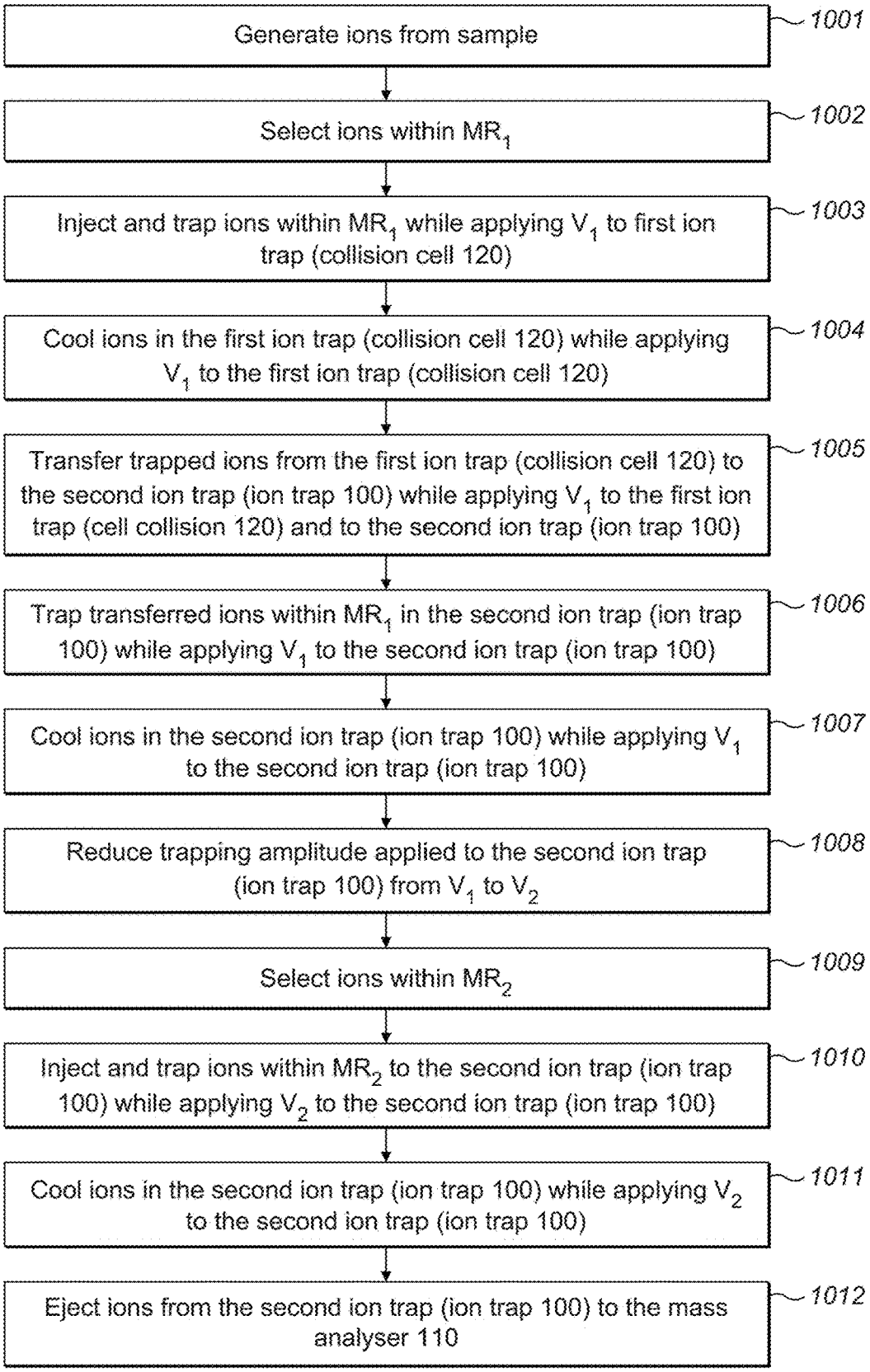
FIG. 10 shows a flowchart illustrating a method of operating the mass spectrometer of FIG. 2 in accordance with a third embodiment of the present invention.
Figure 11:
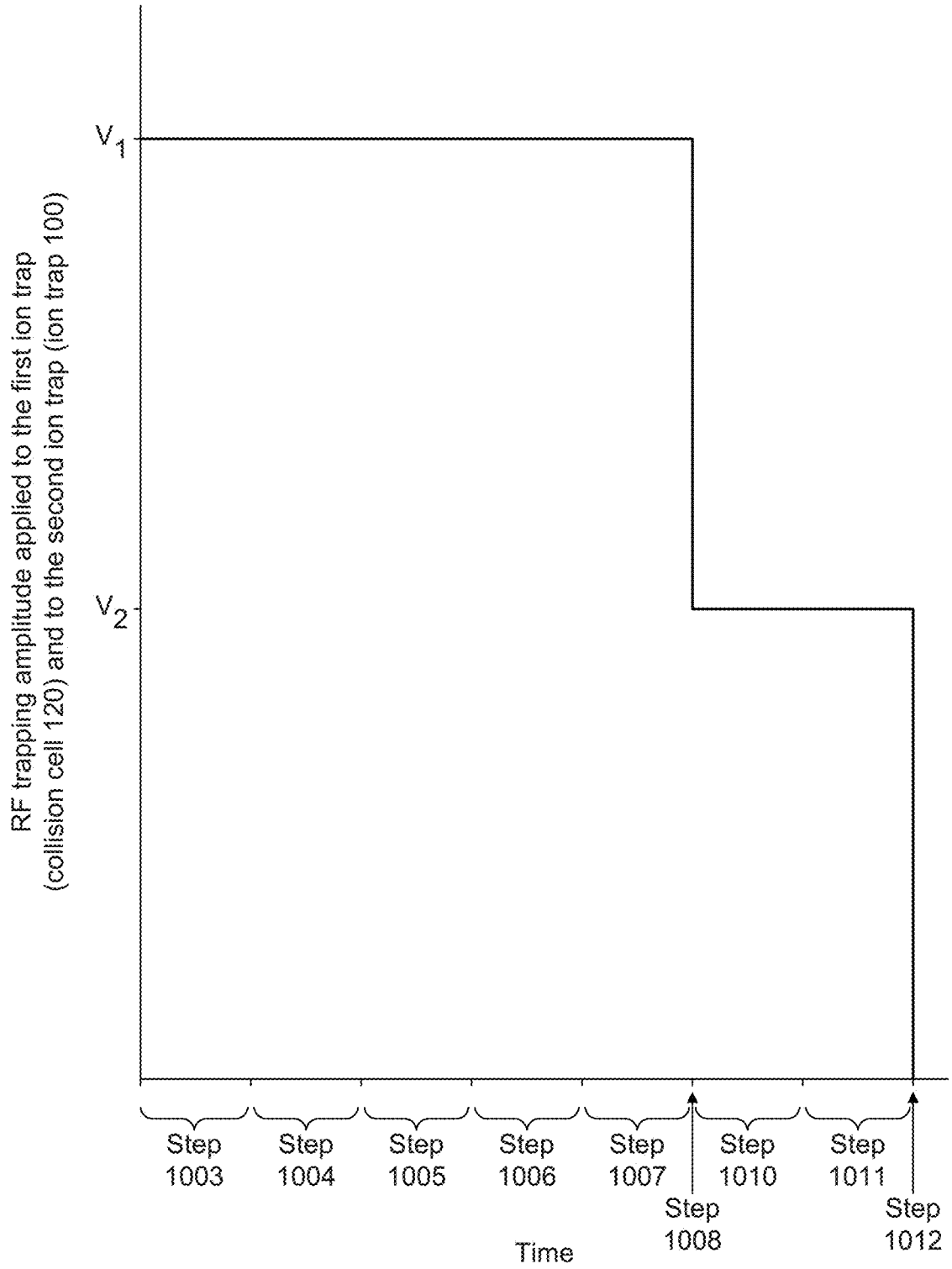
FIG. 11 is a schematic diagram of an RF trapping amplitude applied to the ion trapping assembly vs. time plot for the method depicted in FIG. 10.

FIG. 11 is a plot of RF trapping amplitude applied to both the fragmentation cell 120 and the ion trap 100 vs time for the method depicted in FIG. 10. As discussed above, in the embodiment of FIG. 10, the first corresponding RF trapping amplitude and the first RF trapping amplitude ($V_1$) are the same. Similarly, the second corresponding RF trapping amplitude and the second RF trapping amplitude ($V_2$) are the same. In FIG. 11, the first RF trapping amplitude ($V_1$) and second RF trapping amplitude ($V_2$) are applied for the same duration of time for the injection and trapping of ions. Accordingly, the injection and trapping of ions within the first mass range ($MR_1$) and the injection and trapping of ions within the second mass range ($MR_2$) occur for the same duration of time. Therefore, the intensities of ions measured for the first mass range ($MR_1$) are in proportion with the intensities of ions measured for the second mass range ($MR_2$). Accordingly, the mass spectrum obtained by the mass analyser 110 is not distorted. FIG. 11 also demonstrates that the transfer of ions within the first mass range ($MR_1$) from the fragmentation cell 120 to the ion trap 100 occurs before reducing the RF trapping amplitude to the second RF trapping amplitude ($V_2$) and before trapping of ions within the second mass range ($MR_2$) in the ion trap 100. As shown in FIG. 11, the reduction in RF trapping amplitude from the first RF trapping amplitude ($V_1$) to the second RF trapping amplitude ($V_2$) is performed discontinuously, i.e. as a step change. Alternatively, the reduction in RF trapping amplitude could take place over a longer period of time such that the reduction in RF amplitude occurs as a gradient change rather than a step change.

The embodiment of FIGS. 10 and 11 may be particularly advantageous for addressing the challenges faced when performing mass analysis under high ion load conditions. High load conditions are common when particularly challenging samples are measured. In known arrangements under high ion load conditions, in particular, in liquid chromatography-mass spectrometry-based proteomics applications, deposition of non-transmitted or non-trapped ions having relatively higher m/z may occur when trapping ions in an ion trap/fragmentation cell. Deposition occurs when ions impinge upon and leave residue on the rods and lenses of the ion trap/fragmentation cell due to space charge effects or unstable trajectories. Deposition leads to charging effects that can degrade system performance. Indeed, if the deposits form an insulating layer, the deposits may be charged up by subsequent impinging ions. This would create field disturbances thereby altering ion trajectories and leading to loss of ions from the ion trapping assembly.

In the embodiment of FIGS. 10 and 11, the ions are separated into ions within the first mass range ($MR_1$) (ions having a relatively higher m/z) and ions within the second mass range ($MR_2$) (ions having a relatively lower m/z) upstream of the ion trap 100 and fragmentation device 120. Separation of the ions enables optimisation of the trapping and transmission conditions for the ions having a relatively higher m/z (ions within the first mass range) and ions having a relatively lower m/z (ions within the second mass range).

The ions within the first mass range ($MR_1$) are trapped in a longer trapping volume, since the ions within the first mass range ($MR_1$) are passed through the ion trap 100 to the fragmentation cell 120 and are trapped within the fragmentation cell 120. By passing ions through the ion trap into the fragmentation cell, the RF and DC potentials applied to lenses upstream of the ion trap may focus and accelerate the ions into the ion trap thereby reducing deposition of high mass ions on corresponding lenses. The lenses upstream of the ion trap are, for example, the S-lens 30 and the TK lens 50 or entrance lens of the ion trap itself. Indeed, if the ions were instead trapped in the relatively short volume of only the ion trap, the DC potential applied to the entrance lens of the trap would need to decelerate the ions passing therethrough. The ions are also trapped at a higher pressure, since the fragmentation cell 120 operates at a higher pressure than the C-trap 100. Providing a longer, higher pressure trapping volume for the ions having a relatively higher m/z improves the cooling of the ions having a relatively higher m/z and accordingly reduces deposition of ions having a relatively higher m/z during trapping. A longer, higher pressure trapping volume is particular preferred for, for example, intact proteins which have a relatively long stopping path. Indeed, due to the high momentum of intact proteins, the required number of collisions to cool the ions is higher, which, given a fixed pressure, requires a longer trapping path/distance than for smaller species. Therefore, the embodiment of FIGS. 10 and 11 achieves mass analysis of a large mass range and reduces deposition of ions having a relatively higher m/z under high load conditions. The lower pressure of the ion trap 100 compared to the fragmentation cell 120 may be advantageous as the co-trapped ions of the first and second mass ranges ($MR_1$ and $MR_2$) are subsequently accelerated out of the ion trap 100 to the mass analyser 110.

In the embodiment of FIGS. 10 and 11, ions within the first mass range ($MR_1$) are transferred from the fragmentation cell 120 to the ion trap 100, for subsequent mass analysis. The transfer of the trapped ions to the ion trap 100 requires imparting additional energy to the trapped ions. Therefore, before transfer of the ions from the fragmentation cell 120 to the ion trap 100, the trapped ions within the first mass range ($MR_1$) are cooled (step 1004). The trapped ions are cooled for a period of time sufficient for the trapped ions to reduce their kinetic energy so that they remain within the ion trapping assembly during transfer of the ions to the ion trap 100. The ions within the second mass range ($MR_2$) are not transferred together with the ions in the first mass range ($MR_1$). Instead, the ions within the second mass range ($MR_2$) are directly injected into the ion trap 100 after the ions within the first mass range ($MR_1$) have been transferred to, trapped and cooled in the ion trap 100. By transferring the ions within the first mass range ($MR_1$) without also transferring the ions within the second mass range ($MR_2$), loss of ions during transfer is prevented. Indeed, the ions within the first mass range ($MR_1$) are transferred whilst the first RF trapping amplitude is applied to the ion trap 100 and the fragmentation cell 120. The first RF trapping amplitude ($V_1$) creates a potential well having a potential barrier sufficient to prevent escape of the ions within the first mass range ($MR_1$).

If the ions within the second mass range ($MR_2$) were also simultaneously transferred to the ion trap 100 under the application of the first RF trapping amplitude ($V_1$), then the ions within the second mass range ($MR_2$) would be lost. Indeed, ions below the low mass cut-off of the ion trap 100/fragmentation cell 120 when the first RF trapping amplitude is applied would be lost. If the ions within the first mass range ($MR_1$), although cooled, were transferred together with the ions within the second mass range ($MR_2$) to the ion trap 100 at the second RF trapping amplitude ($V_2$), then some of the ions within the first mass range ($MR_1$) would be lost. The potential well created by the second RF trapping amplitude ($V_2$) has a lower potential barrier (the energy required for an ion to escape the potential well) than that created by the first RF trapping amplitude ($V_1$). Accordingly, the ions within the first mass range ($MR_1$) having the additional energy imparted during transfer would have sufficient energy to escape the potential well created by the second RF trapping amplitude ($V_2$). Therefore, loss of some of the ions within the first mass range ($MR_1$) may occur during transfer.

Figure 12A:
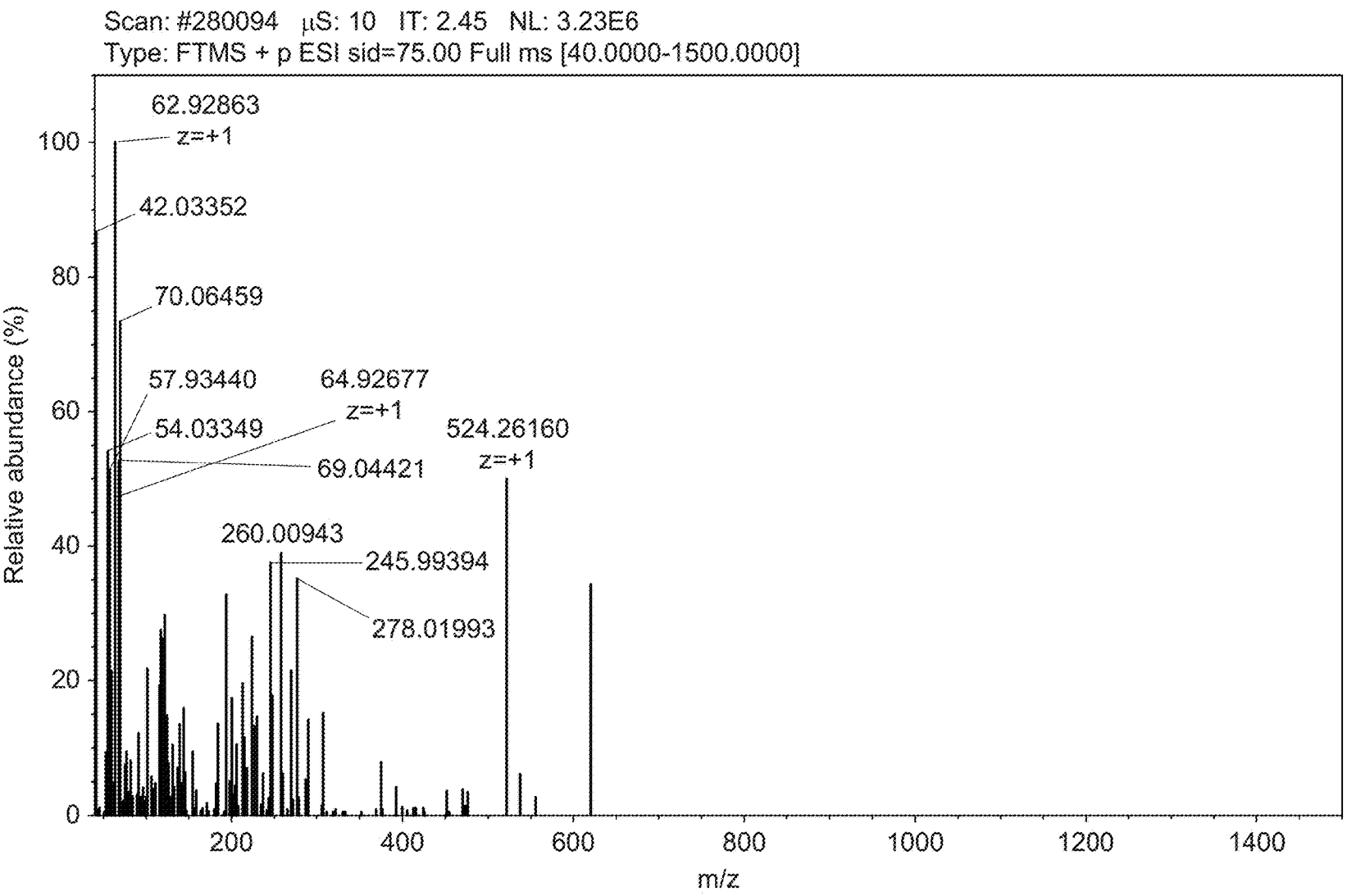
FIG. 12(a) is a mass spectrum obtained when trapping ions within first and second mass ranges in a fragmentation cell in accordance with the method of the first embodiment and transferring ions from the fragmentation cell to an ion trap whilst applying the second RF trapping amplitude. A calibration sample (Calmix) was used.
Figure 12B:
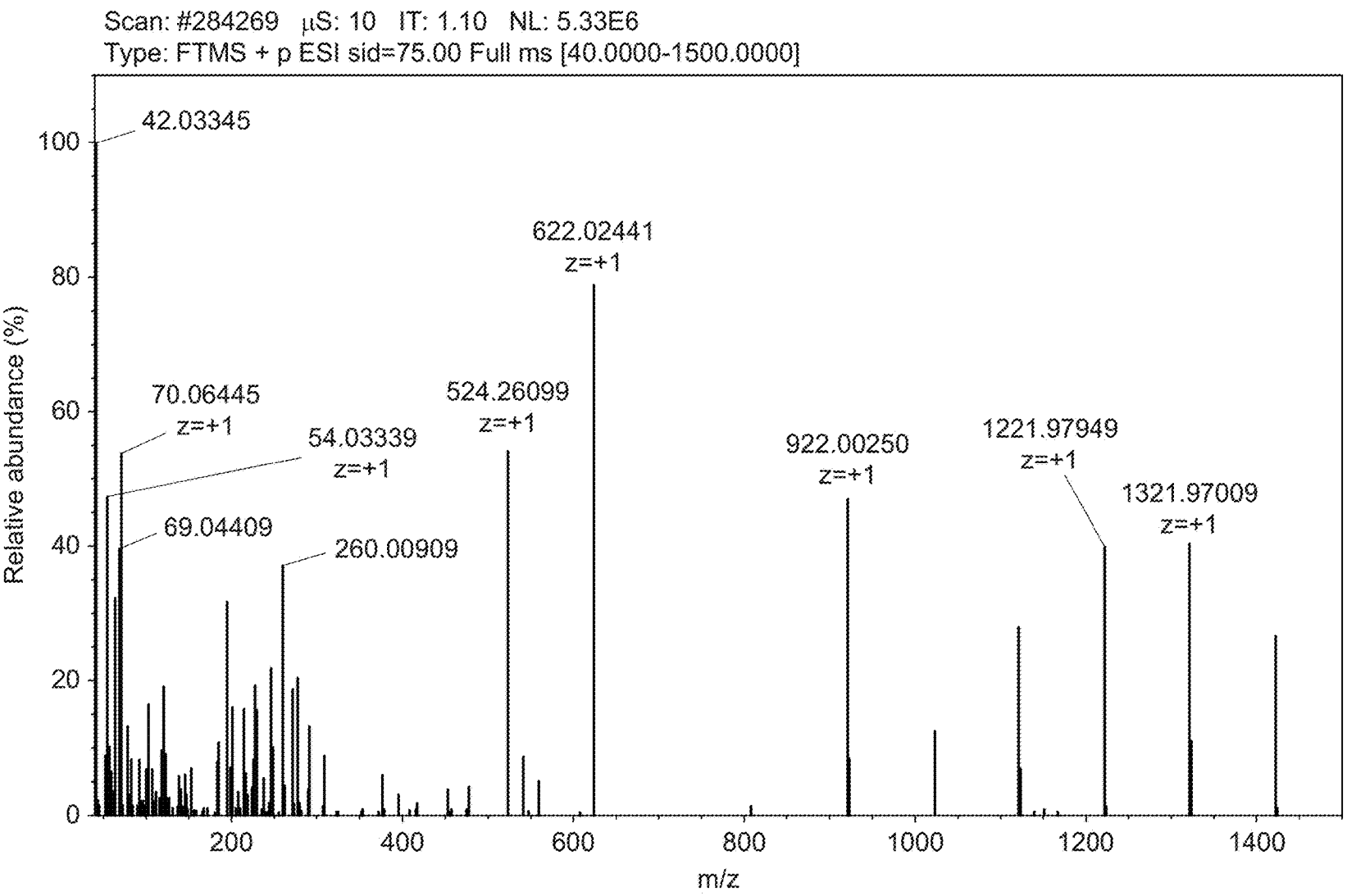
FIG. 12(b) is a mass spectrum obtained using a calibration sample (Calmix) in accordance with the third embodiment of the present invention.

The balance of maximising mass range whilst providing a longer, higher pressure trapping volume for the relatively higher mass ions is demonstrated by comparing FIGS. 12(a) and 12(b). FIG. 12(a) shows a mass spectrum obtained when performing trapping of ions within the fragmentation cell 120 according to the methods of FIGS. 3 and 4 and transfer of the ions within the first and second mass ranges together to the ion trap 100 whilst applying the second RF trapping amplitude ($V_2$). FIG. 12(b) shows a mass spectrum obtained when performing the method of FIGS. 10 and 11. The mass spectra of FIGS. 12(a) and 12(b) were obtaining using the calibration sample Calmix, which is discussed above. On comparing FIGS. 12(a) and 12(b), it can be seen that in FIG. 12(a), only ions having m/z up to 622 are analysed. Indeed, ions having m/z greater than 622 have been lost during the transfer of ions to the ion trap 100. Whereas in FIG. 12(b), ions from m/z 42 to at least 1422 have been trapped in the same trapping assembly and simultaneously analysed. Accordingly, FIG. 12(b) demonstrates that the embodiment of FIGS. 10 and 11 enables trapping of relatively higher mass ions in a longer, higher pressure trapping volume whilst also maximising the mass range analysed. Accordingly, the conditions for trapping relatively high mass ions (ions within the first mass range) ($MR_1$) and relatively lower mass ions (ions within the second mass range) ($MR_2$) are optimised whilst enabling analysis of both high and low mass ions together.

Whilst FIGS. 12(a) and 12(b) describe the ion cooling device to be the fragmentation cell 120 and the ion trap to be the ion trap 100 of FIG. 2, which are adjacent to each other, the invention could equally be employed with other combinations of adjacent ion trapping/cooling devices. The ion cooling device may be an ion trap, such as a C-trap.

Whilst the ion trap described in relation to FIGS. 10 and 11 has been described as being a C-trap 100, the ion trap may be an ion trap that is also configured to perform mass analysis. Accordingly, the mass analysis described in step 1012 may be performed in the ion trap thereby avoiding the need to eject the trapped ions for mass analysis.

As shown in FIG. 2, the ion cooling device (fragmentation cell 120) is downstream of the ion trap 100. However, the invention could equally be employed with the ion trap downstream of the ion cooling device.

FIGS. 10 and 11 describe introducing and trapping of the ions within the second mass range ($MR_2$) in the ion trap 100. Alternatively, the ions within the second mass range ($MR_2$) may be introduced and trapped in the ion cooling device (fragmentation cell 120) and then transferred to the ion trap 100 (similarly to steps 1002-1005). In such an embodiment, once the ions within the first mass range ($MR_1$) have been cooled in the ion trap 100 (step 1007), the RF trapping amplitude applied to the fragmentation cell 120 is reduced to the second corresponding RF trapping amplitude. The low mass cut-off of the fragmentation cell 120 when the second corresponding RF trapping amplitude is applied to the fragmentation cell 120 is the same as the low mass cut-off of the ion trap 100 when the second RF trapping amplitude is applied to the ion trap 100. The ions within the second mass range ($MR_2$) are selected (step 1009) upstream of the fragmentation cell 120 and the ion trap 100. The ions within the second mass range ($MR_2$) are then introduced into the fragmentation cell 120 and trapped in the fragmentation cell 120 by the application of the second corresponding RF trapping amplitude to the fragmentation cell 120. The ions within the second mass range ($MR_2$) are then cooled and subsequently transferred to the ion trap 100 whilst applying the second corresponding RF trapping amplitude to the fragmentation cell 120 and the second RF trapping amplitude ($V_2$) to the ion trap 100. The ions within the second mass range ($MR_2$) are then trapped in the ion trap 100 by the second RF trapping amplitude ($V_2$). Once trapped, the trapped ions within the first and second mass ranges are cooled together. Both the ions within the first mass range ($MR_1$) and the second mass range ($MR_2$) may be ejected together to the mass analyser 110 from the ion trap 100. This method can be performed using three, four, five or more different mass ranges. Indeed, the method can include applying n further RF trapping amplitudes to the fragmentation cell 120, n being one or more. Each of the RF trapping amplitudes can be between the first and second RF trapping amplitudes. Each of the ions introduced to the fragmentation cell 120 and having a respective nth mass range (range of m/z ratios) will be trapped by application of n further trapping amplitudes to the fragmentation cell 120. The controller 130 maintains the current RF trapping amplitude applied to the fragmentation cell 120 and to the ion trap 100 for a period of time sufficient for the ions within the fragmentation cell 120 to cool, be transferred to and trapped in the ion trap 100 and cool within the ion trap 100 before reducing the RF trapping amplitude to a relatively lower trapping amplitude. The ions are cooled in the trap 100 once transferred thereto for a period of time sufficient for the trapped ions to reduce their kinetic energy so that they remain trapped on reducing the RF trapping amplitude.

Each of the n further RF trapping amplitudes may be intermediate RF trapping amplitudes i.e. between those first and second RF trapping amplitudes ($V_1$, $V_2$). In this arrangement, instead of reducing the RF trapping amplitude directly from the first to the second trapping amplitude, the RF trapping amplitude is reduced stepwise via the intermediate RF trapping amplitudes. Therefore, the change in RF trapping amplitude performed each time is smaller.

Alternatively, the n further RF trapping amplitudes may be employed to increase the mass range of ions ultimately trapped within the ion trapping assembly compared to the method of FIGS. 10 and 11. For example, one or more of the n further RF trapping amplitudes may not be between the first and second RF trapping amplitudes. One or more of the n further RF trapping amplitudes may be greater than the first RF trapping amplitude ($V_1$). Accordingly, by applying that greater RF trapping amplitude before reducing the RF trapping amplitude to the first RF trapping amplitude ($V_1$), it would be possible to trap ions having a higher mass than the upper mass limit of the first mass range ($MR_1$). Alternatively, or additionally, one or more of the n further RF trapping amplitudes may be lower than the second RF trapping amplitude ($V_2$). By applying that lower RF trapping amplitude, the low mass cut-off of the ion trapping assembly will be reduced. Accordingly, by reducing the RF trapping amplitude to that lower RF trapping amplitude after applying the second RF trapping voltage ($V_2$), it would be possible to trap ions having a lower mass than the low mass cut-off of the ion trapping assembly when the second RF trapping amplitude ($V_2$) is applied.

The RF trapping amplitudes applied to the ion cooling device and the ion trap may be changed in synchronisation, for example where both the devices are connected to the same RF power supply. Alternatively, the RF trapping amplitude applied to the ion cooling device may be controlled independently to the RF trapping amplitude applied to the ion trap.

It will be understood that in the embodiments described with reference to FIGS. 2, 10 and 11, the ions are introduced into the ion cooling device (fragmentation cell 120) in one direction and are subsequently transferred from the ion cooling device to the ion trap 100 in the opposite direction, i.e. the ions change direction.

In some other embodiments, the ions need not change direction upon transfer between devices within the ion trapping assembly. For example, in the Orbitrap™ Fusion Lumos mass spectrometer 15 from Thermo Fisher Scientific shown schematically in FIG. 13, wherein components in common with the apparatus of FIG. 2 are given like reference numerals, the ion cooling device/ion trap can be provided by the dual pressure linear ion trap 1140. In this case the high pressure ion trap 1120 can be the ion cooling device and the low pressure ion trap 1110 can be the ion trap. The ions in this embodiment do not need to change direction. The first and second RF trapping amplitudes are applied to the ion cooling device (high pressure ion trap 1120) and ion trap (low pressure ion trap 1110) in the manner described above, for example with reference to FIGS. 10 and 11. The difference is that ions are introduced into the ion cooling device (high pressure ion trap 1120) in one direction from the ion source 20 and are subsequently transferred from the ion cooling device 1120 to the ion trap (low pressure ion trap 1110) in the same direction, i.e. the ions do not change direction. It will be appreciated that the description of components of the mass spectrometer shown in FIG. 2 equally applies to the components of the mass spectrometer shown in FIG. 13 having like reference numerals.

In variations of any of the above embodiments, the ion trap and the mass analyzer can be the same device, i.e. such that there is no ejection from the ion trap to the mass analyzer. For example, in the embodiment shown in FIG. 13, the low pressure ion trap 1110 is a mass analysing ion trap having detector 1115.

Figure 13:
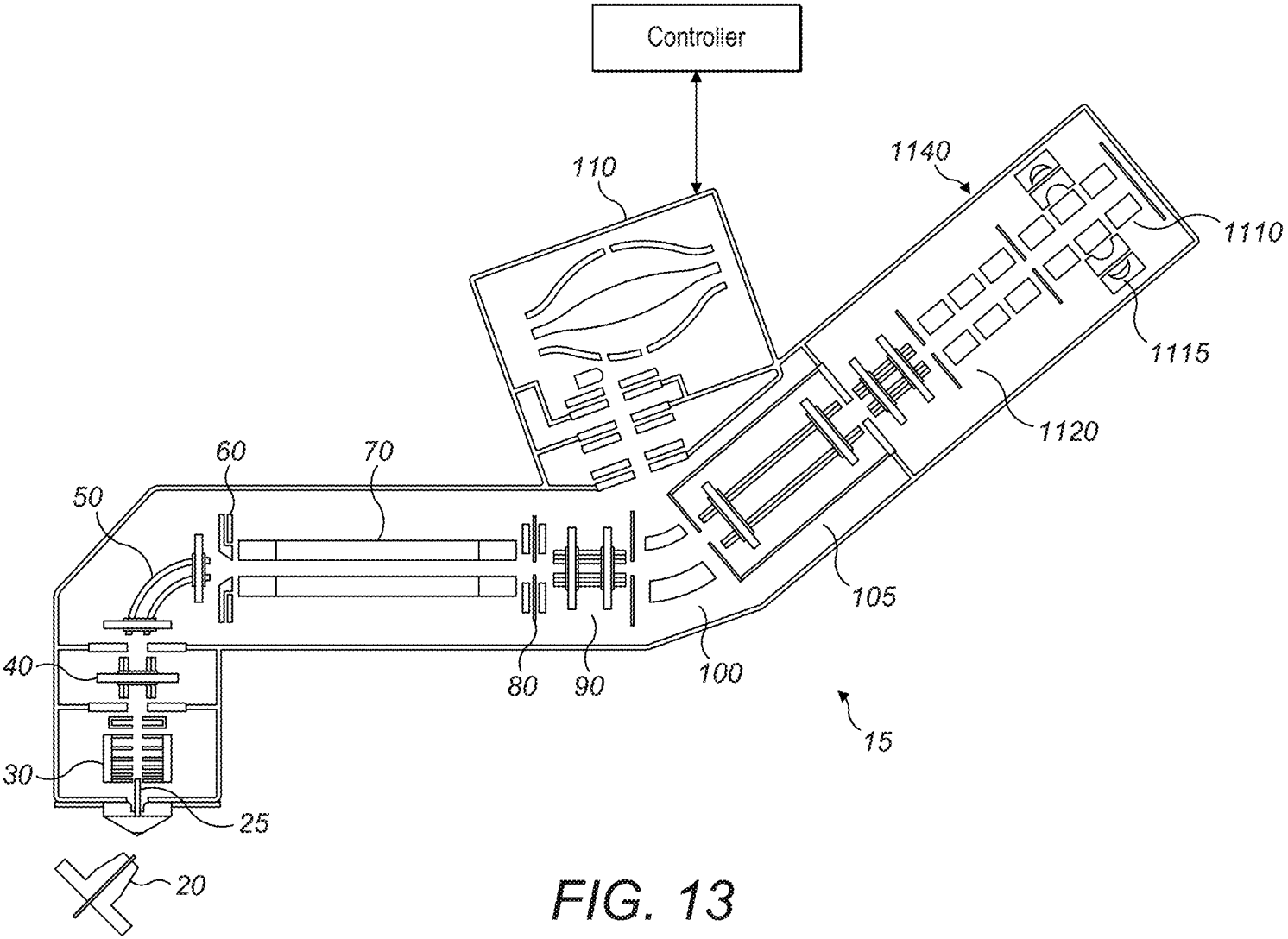
FIG. 13 is a schematic diagram of a second embodiment of a mass spectrometer with an ion trap and an ion cooling device in accordance with the present invention.

In some embodiments, the ion cooling device (which could also be configured for ion fragmentation) could be a fragmentation cell 105 upstream of an ion trap as in the Orbitrap™ Fusion Lumos instrument shown in FIG. 13. The fragmentation cell 105 can be the ion cooling device, the high pressure ion trap 1120 can be the ion trap that receives ions transferred from the ion cooling device (fragmentation cell 105) and the low pressure ion trap 1110 can be the mass analyser that receives the trapped ions that are ejected from the high pressure ion trap 1120. In this case, the ions need not be trapped in the ion cooling device (fragmentation cell 105) and the ion cooling device (fragmentation cell 105) can be operated in transmission mode. The first and second RF trapping amplitudes are otherwise applied to the ion cooling device and ion trap in the manner described above, for example with reference to FIGS. 10 and 11.

In all of the described embodiments wherein the RF trapping amplitude is reduced from a first to a second trapping amplitude, it will be appreciated that instead (or in addition) the RF trapping frequency may be increased from a first trapping frequency to a second trapping frequency.

It is to be understood that the controller 130 of FIG. 2 may be configured to control the controlling the trapping and fragmentation of ions in accordance with the methods described herein. For example, the controller 130 may be configured to control the RF trapping amplitudes/frequencies applied to the electrode assembly(s) of the ion trap(s) and/or the electrode assembly(s) of the fragmentation cell(s) in accordance with the methods described herein.

It is to be understood that the specific arrangement of components shown in FIG. 2 is not essential to the methods subsequently described. Indeed other arrangements for carrying out the ion trapping methods of embodiments of the present invention are suitable.

Whilst the invention has been discussed in relation to a C-trap of a Q Exactive® hybrid quadrupole Orbitrap® mass spectrometer, it will be appreciated that the invention equally applies to other ion traps used with or without mass analysers. The present invention could be used for a linear ion trap (e.g. with curved or straight elongate electrodes) or even a 3D (Paul-type) ion trap. The ion trap may be operated as an ion storage device without mass analysis of the ions or it may be operated with mass analysis of the trapped ions, where the ion trap itself is the mass analyser. The ion trap is preferably an RF multipole ion trap, preferably a quadrupole, or hexapole, or octapole ion trap. Furthermore, in embodiments, where the ion trap is configured to eject the stored ions to a mass analyser to mass analyse the ions, the mass analyser need not be of an orbital trapping type but may be a mass analyser of another type, such as a time of flight (ToF) mass analyser, or FT-ICR mass analyser, or another type of ion trap mass analyser, including an electrostatic ion trap mass analyser.

The method step of cooling the trapped ions has been described and shown in the Figures as a separate, deliberately programmed period of time specifically for cooling. The cooling may instead occur during the time period required to change the electronics to adjust RF trapping amplitude/frequency. This may be the case if the time required to change the electronics to adjust the RF trapping amplitude/frequency is greater than the time required to lower the energy of trapped ions so that they remain trapped on changing the RF trapping amplitude/frequency. If so, the RF trapping amplitude/frequency may not be held constant whilst the trapped ions are cooled. Instead, the RF trapping amplitude may be lowered directly after trapping of ions at the relatively higher RF trapping amplitude. The cooling would then take place during adjustment of the electronics to lower the RF trapping amplitude. Similarly, the RF trapping frequency may be increased after trapping of ions at the relatively lower RF trapping frequency. The cooling would then take place during adjustment of the electronics to increase the RF trapping frequency. Typical cooling times may be on the order of at least 1-10 ms, or at least 1-5 ms, e.g. at least 1 ms, at least 2 ms, or at least 3 ms, or at least 4 ms, or at least 5 ms. A typical cooling time, for example, for peptides and singly charged ions in the 400-1000 Th range would be a few ms at a background pressure of $1\times10^{-3}$ mbar.

The method of the present invention could be applied with steps 405 and 406 starting in either order, or simultaneously. For example, whilst the RF trapping amplitude is reduced from the relatively higher to the relatively lower trapping amplitude, the RF amplitude applied to the other components of the mass spectrometer upstream of the ion trap may also be reduced at the same time. The same applies to the method of FIGS. 5 and 6 and the method of FIGS. 10 and 11. For example, steps 605 and 606 may be performed in starting in either order, or simultaneously. Similarly, steps 1008 and 1009 may be performed in starting in either order, or simultaneously.

In the method of FIGS. 3, 5 and 10, the ions may be introduced to the ion trapping assembly as a continuous stream of ions whilst the other steps of the method are performed. Of course, only those ions in the relevant mass range will be selected by the upstream ion device when the relevant RF amplitude is applied. Similarly, only those ions in the relevant mass range will be trapped in the ion trapping assembly when the relevant RF trapping amplitude is applied. By way of example, referring to the method of FIG. 3, the introduction of ions into the ion trapping assembly may occur continuously whilst steps 402 to 408 are performed. Similarly, the introduction of ions into the ion trapping assembly may occur continuously whilst steps 602 to 620 are performed. Alternatively, the introduction of ions to the ion trapping assembly may be performed intermittently. For example, ions may only be introduced into the ion trapping assembly when the relevant RF trapping amplitude is applied and stopped whilst the RF trapping amplitude is reduced and/or cooling is performed. By way of example, referring to the method of FIG. 3, a first introduction of ions may be performed whilst steps 402 and 403 are carried out. Whilst steps 404 and 405 are performed, the introduction of ions may be stopped. A second introduction of ions may be performed whilst steps 406 and 407 are carried out. Whilst steps 408 and 409 are performed, the introduction of ions may be stopped. Generally, a period of introduction of ions to the ion trapping assembly is controlled so as to not overfill the ion trapping assembly, i.e. to avoid space charge effects, which are discussed above in relation to FIG. 8 A period of introduction of ions to the ion trapping assembly will thus typically depend on the ion current.

Each mass range (MR) may or may not overlap with each other. By way of example, the first and second mass ranges ($MR_1$, $MR_2$) may overlap with each other. The intensities of ions within the region of overlap may not be in proportion with the intensities of ions outside the region of overlap. The controller 130 may be configured to compensate for this thereby ensuring that the relative abundances in the resulting mass spectrum are not distorted through double counting of ions in the overlapping region(s).

The RF trapping amplitude vs time plot of FIGS. 4, 6 and 9 show that the reduction in RF trapping amplitude occurs discontinuously. The reduction in RF trapping amplitude may instead occur continuously. By reducing the RF trapping amplitude continuously, the LMCO of the ion trapping assembly is continuously reduced from the LMCO of the first RF trapping amplitude ($V_1$) to the LMCO of the second, lower RF trapping amplitude ($V_2$). The lower mass limit of the selected mass range transmitted by the upstream ion device may also be continuously reduced. For example, if the upstream ion device is one or more of the RF components upstream of the ion trapping assembly, such as the S-lens 30, then the lower mass limit of the selected mass range is continuously reduced by continuously reducing the RF amplitude applied to the RF component(s) upstream of the ion trapping assembly. The reduction of the RF trapping amplitude applied to the ion trapping assembly may be reduced continuously in synchronism with the reduction in the lower mass limit of the selected mass range. Therefore, ions of decreasing m/z ratios pass through the S-lens 30, the injection flatapole 40, bent flatapole 50, the quadrupole mass filter 70, the quadrupole exit lens/split lens arrangement 80, through the transfer multipole 90 and are introduced and trapped in the ion trapping assembly. The rate at which the RF trapping amplitude is reduced is selected by the controller 130 such that higher mass ions within the ion trapping assembly have sufficient time to reduce their kinetic energy so that they remain trapped in the ion trapping assembly on reducing the RF trapping amplitude for introduction of lower mass ratio ions. Ion may be introduced into the ion trapping assembly whilst the RF trapping amplitude is reduced. The ions may be introduced into the ion trapping assembly continuously whilst the RF trapping amplitude is applied. Alternatively, the ions may be introduced into the ion trapping assembly intermittently, as a series of multiple injections, so as to avoid overfilling the ion trapping assembly. Generally, a period of introduction of ions to the ion trapping assembly is controlled so as to not overfill the ion trapping assembly, i.e. to avoid space charge effects, which are discussed above in relation to FIG. 8. A period of introduction of ions to the ion trapping assembly will thus typically depend on the ion current. In the embodiment where the RF trapping amplitude is reduced continuously, the rate of this reduction may be constant. Alternatively, the rate of reducing the RF trapping amplitude may not be constant. For example, the rate of reducing the RF trapping amplitude may be decreased as the RF trapping amplitude is reduced. Alternatively, the rate of reducing the RF trapping amplitude may be increased as the RF trapping amplitude is reduced. Optionally, the first RF trapping amplitude ($V_1$) may be applied constantly for a certain period of time before the RF trapping amplitude is continuously reduced to the second RF trapping amplitude ($V_2$). The second RF trapping amplitude ($V_2$) may then be applied constantly for a certain period of time.

The RF trapping amplitude vs time plots of FIGS. 4,6 and 9 show that each RF trapping amplitude is applied for the same duration. This is desirable to avoid distortions in the resulting mass spectrum, as discussed above. The RF trapping amplitudes may instead be applied for different durations. Alternatively, some of the RF trapping amplitudes may be applied for the same duration and some of the RF trapping amplitudes may be applied for a different duration. The application of different RF trapping amplitudes for different durations may result in distortions in the intensities of ions. The controller 130 may be further configured to compensate for such distortions such that the peaks of the mass spectrum are in proportion.

FIG. 6 shows that each of the third, fourth and fifth RF trapping amplitudes ($V_3$, $V_4$, $V_5$) are equally spaced between the first and second RF trapping amplitudes ($V_1$, $V_2$). However, the third, fourth and fifth RF trapping amplitudes ($V_3$, $V_4$, $V_5$) may not be equally spaced between the first and second RF trapping amplitudes ($V_1$, $V_2$).

The embodiments of the present invention discuss selection of ions within a certain mass range upstream of the ion trapping assembly by an upstream ion device. Any ion device that has an adjustable mass transmission profile (i.e. variable upper mass limit and/or lower mass limit) may be used to perform this selection. For example, the mass filter 70 may be set to the desired mass range by the controller 130 such that the mass filter 70 filters the sample ions according to the desired mass range. This option is less desirable for a broad "full MS" scan, since selecting the mass range by using the mass filter 70 typically provides mass ranges that are too narrow. The embodiments of the present invention discuss adjusting the upstream ion device to change the lower mass limit of the selected mass range of ions transmitted by the upstream ion device. Alternatively or additionally, the upstream ion device may be adjusted to change the upper mass limit of the selected mass range of ions transmitted by the upstream ion device.

In some embodiments, ions may be selected by an upstream ion device (upstream of the ion trap), preferably a mass selector such as mass filter 70, such that first and second ranges of m/z ratios (and optionally n further ranges of m/z ratios) are selected that preferably do not overlap. This can enable increased dynamic range of analysis and enable better quantitation. Thus, in some embodiments, ions may be selected in a first range of m/z ratios and introduced into the ion trapping assembly while applying the first RF trapping amplitude to the ion trap, so as to trap the introduced ions which have m/z ratios within the first range of m/z ratios and cool the trapped ions. The RF trapping amplitude is then reduced from the first RF trapping amplitude to the second, lower, RF trapping amplitude so as to reduce the low mass cut-off of the ion trapping assembly and ions may be selected in a second range of m/z ratios (not overlapping the first range) and introduced into the ion trapping assembly while applying the second lower RF trapping amplitude to the ion trapping assembly, so as to trap the introduced ions which have m/z ratios within the second range of m/z ratios. In this case the upper boundary of the second mass range is sharply defined by mass filter while the lower boundary could be defined preferably by the same mass filter or by the low mass cut-off corresponding to the second RF amplitude. The m/z ratios of the second range of m/z ratios are preferably below the m/z ratios of the first range. In such embodiments, a lower mass limit, and in some cases the upper mass limit, of the second range of m/z ratios is below the low mass cut-off of the ion trapping assembly when the first RF trapping amplitude is applied.

The selection of ions according to a certain mass range upstream of the ion trapping assembly is optional. For example, the ion trapping assembly may receive all sample ions generated by the ion source 20 and the RF trapping amplitude applied to the ion trapping assembly will control the ion trapping of ions such that only those ions within the desired mass range are trapped.

Prior to injection into the mass analyser 110, the ions within the first mass range ($MR_1$) and/or ions within the second mass range ($MR_2$) may be fragmented in the fragmentation cell 120. The fragments may be accumulated in the C-trap 100 prior to ejection into the mass analyser as a single pulse for acquisition as a single spectrum. Alternatively, where the mass analyser 110 is a TOF mass analyzer, then fragment ions in the fragmentation cell 120 may be continuously leaked from that fragmentation cell 120.

The embodiments of the present invention may be applied to trapping product/fragment ions generated from precursor ions. The ion trapping assembly, which may be an ion trap, may be configured to fragment ions or comprise a device to fragment ions. Precursor ions may be introduced into the ion trapping assembly and fragmented to generate product ions. The RF trapping amplitude applied to the ion trapping assembly may be varied to trap product ions within a certain range of m/z ratios. For example, product ions having m/z ratios within a first range of m/z ratios may be trapped in the ion trapping assembly by applying the first RF trapping amplitude. Those trapped product ions may be cooled to reduce their energy so that the trapped product ions remain trapped in the ion trapping assembly on reducing the RF trapping amplitude. The RF trapping amplitude may be reduced to a second, relatively lower RF trapping amplitude, so as to reduce the low mass cut-off of the ion trap. Product ions having m/z ratios within a second range of m/z ratios may be trapped at the second RF trapping amplitude. The lower mass limit of the second range of m/z ratios is below a low mass cut-off of the ion trapping assembly when the first RF trapping amplitude is applied.

The precursor ions may be introduced into the ion trapping assembly and/or fragmented in the ion trapping assembly continuously. For example, step (a) may be performed continuously while steps (b) to (f) are performed. Alternatively, introduction and fragmentation of precursor ions may occur intermittently to avoid overfilling the ion trapping assembly. For example, introduction and fragmentation of ions may only occur for a period whilst the first RF trapping amplitude is applied in order to trap a desired number of product ions. Introduction and fragmentation of ions may be ceased while the trapped product ions are cooled. Introduction and fragmentation of ions may occur again for a period whilst the second RF trapping amplitude is applied in order to trap a desired number of product ions. The product ions trapped by the first RF trapping amplitude may be generated from the same precursor ions as the product ions trapped by the second RF trapping amplitude. Alternatively, the product ions trapped by the first RF trapping amplitude may be generated from different precursor ions compared to the product ions trapped by the second RF trapping amplitude. The product ions trapped by the first RF trapping amplitude may be generated at the same or a different collision energy compared to the product ions trapped by the second RF trapping amplitude. The product ions trapped by the first RF trapping amplitude and the product ions trapped by the second RF trapping amplitude may be ejected together to a mass analyser.

The method of trapping ions in an ion trapping assembly configured to fragment ions may comprise applying n further RF trapping amplitudes, each being intermediate the first and second RF trapping amplitudes, to the ion trap, wherein n≥1, each of the n further RF trapping amplitudes causing product ions having a respective nth range of m/z ratios, each having lower mass limits, to be trapped; the method further comprising cooling the product ions which are trapped at a relatively higher RF trapping amplitude before reducing the RF trapping amplitude to a relatively lower trapping amplitude.

The method of trapping product ions in an ion trap configured to fragment ions can be applied, in some embodiments, to the fragmentation cell 120 of the shown mass spectrometer. In some embodiments, the fragmentation cell 120 comprises an RF trapping device, such as an RF multipole, so that the fragmentation cell 120 can be operated in accordance with the invention. The fragmentation cell 120 is operated at a higher pressure than the ion trap 100 and can be operated in high and low fragmentation modes (low fragmentation including a mode without fragmentation), for example by applying suitable voltage offsets between the ion trap 100 and the fragmentation cell 120. In some methods of operation, after trapping product/fragment ions generated from precursor ions in the fragmentation cell 120 in accordance with the invention, the product/fragment ions may be transferred from the fragmentation cell 120 to the ion trap 100 while applying the second, lower RF trapping amplitude. Accordingly, in some embodiments, trapped product/fragment ions having m/z ratios within the first and second range of m/z ratios ($MR_1$, $MR_2$) are transferred from the ion trap configured to fragment ions to a further ion trap, the further ion trap having a different pressure to the ion trap configured to fragment ions and the ions are transferred while the second, lower RF trapping amplitude ($V_2$) is applied. Typically, the further ion trap is held at lower pressure than the ion trap configured to fragment ions, e.g. at least 1 or at least 2 orders of magnitude lower pressure. More generally, pressure in the ion trap configured to fragment ions multiplied by length of the ion trap configured to fragment ions, is significantly higher than the pressure of the further ion trap multiplied by the length of the further ion trap. This ensures efficient trapping and transfer of high-m/z ions such as intact proteins or protein complexes.

The above described embodiments that include fragmentation of the ions in the ion trap can also be applied mutatis mutandis to an ion trapping assembly comprising multiple electrode assemblies, at least one of the electrode assemblies being configured to fragment ions. For example, the above described embodiments that include fragmentation of the ions in the ion trap can also be applied mutatis mutandis to the embodiments described with reference to FIGS. 10 and 11, wherein the ion trapping assembly to which the RF trapping amplitudes are applied comprises the ion cooling device (fragmentation cell 120) and the ion trap (ion trap 100). For example, the fragmentation steps can be applied to the ions introduced to the fragmentation cell 120 when the first and second RF trapping amplitudes are applied. In this way, product ions which have m/z ratios within a first range of m/z ratios ($MR_1$) can be trapped along with product ions which have m/z ratios within a second range of m/z ratios ($MR_2$). The lower mass limit of the second range of m/z ratios ($MR_2$) can be below the low mass cut-off of the ion trapping assembly when the first RF trapping amplitude ($V_1$) is applied.

For example, precursor ions may be introduced into the ion cooling device (fragmentation cell 120) of the ion trapping assembly. The precursor ions may then be fragmented in the ion cooling device to generate product ions. The product ions having m/z ratios within the first range of m/z ratios may be trapped and cooled in the ion cooling device whilst the first RF trapping amplitude ($V_1$) is applied to the ion cooling device. The product ions may then be transferred from the ion cooling device to the ion trap (ion trap 100) with minimal additional energy whilst applying the first corresponding RF trapping amplitude to the ion trap and the first RF trapping amplitude ($V_1$) to the ion cooling device. Accordingly, during the transfer, the low mass cut-off of the ion trap is the same as the low mass cut-off of the ion cooling device. The product ions may then be trapped and cooled in the ion trap whilst applying the first corresponding RF trapping amplitude. Once cooled, the RF trapping amplitude applied to the ion cooling device is reduced to the second corresponding RF trapping amplitude. Optionally, the RF trapping amplitude applied to the ion trap is reduced to the second RF trapping amplitude ($V_2$) such that the low mass cut-off of the ion trap is the same as the low mass cut-off of the ion cooling device. Further fragmentation of precursor ions may optionally take place in the ion cooling device. The product ions having m/z ratios within the second range of m/z ratios may then be trapped in the ion cooling device by applying the second corresponding RF trapping amplitude to the ion cooling device. The product ions may be cooled in the ion cooling device whilst the second corresponding RF trapping amplitude is applied to the ion cooling device. The product ions may then be transferred from the ion cooling device to the ion trap (ion trap 100) with minimal additional energy whilst second corresponding RF trapping amplitude to the ion cooling device and the second RF trapping amplitude ($V_2$) to the ion trap. The product ions may then be trapped in the ion trap by application of the second RF trapping amplitude ($V_2$) to the ion trap. It is preferred in such embodiments that the ion cooling device is located upstream of the ion trap. Subsequently, the product ions having m/z ratios within the first and second range of m/z ratios ($MR_1$, $MR_2$) may be transferred to a further ion trap having a different pressure to the ion trap of the ion trapping assembly while the second RF trapping amplitude ($V_2$) is applied. The controller 130 may be configured to control the controlling the trapping and fragmentation of ions in accordance with such a method.

Optionally, the further ion trap may have a lower pressure than the ion trap and ion cooling device of the ion trapping assembly. The pressure of the further ion trap multiplied by length of the further ion trap may be less than the pressure of the ion trap of the ion trapping assembly multiplied by length of the ion trap of the ion trapping assembly.

The product ions within the second mass range ($MR_2$) may not be trapped in the ion cooling device and transferred to the ion trap. Instead, the product ions within the second mass range ($MR_2$) may pass through the ion cooling device to the ion trap while the second RF trapping amplitude is applied to the ion cooling device and to the ion trap. The product ions within the second mass range ($MR_2$) may then be trapped in the ion trap by applying the second RF trapping amplitude ($V_2$) to the ion trap once the product ions within the first mass range ($MR_1$) have been cooled. In an alternative embodiment, the fragmentation may be performed in the ion trap of the ion trapping assembly instead of the ion cooling device. The product ions may then be transferred to the ion cooling device and trapped therein. By way of a further alternative, the ion trap and the ion cooling device may both fragment the precursor ions to generate product ions. The first RF trapping amplitude ($V_1$) may be applied to the ion trap to trap product ions within the first mass range. The second RF trapping amplitude ($V_2$) may be applied to the ion cooling device to trap product ions within the second mass range. The trapped ions may be cooled before transferring the trapped ions to the further ion trap.

The invention has been described in relation to reducing the low mass cut-off of the ion trapping assembly by reducing the RF trapping amplitude. However, it is also possible to reduce the low mass cut-off of the ion trapping assembly by increasing the RF trapping frequency applied to the ion trapping assembly. Furthermore, it is possible to changing both the RF trapping amplitude and RF trapping frequency so that the net effect is to reduce the low mass cut-off of the ion trapping assembly.

Indeed, the method could be considered as a method of trapping ions in an ion trapping assembly, the method comprising introducing ions into the ion trapping assembly, applying a first RF trapping waveform to the ion trapping assembly, so as to trap introduced ions which have m/z ratios within a first range of m/z ratios, cooling the ion trapped ions, changing the RF trapping waveform from the first RF trapping waveform to a second RF trapping waveform so as to reduce the low mass cut-off of the ion trapping assembly; and trapping, at the second RF trapping waveform, introduced ions having m/z ratios within a second range of m/z ratios, wherein a lower mass limit of the second range of m/z ratios is below the low mass cut-off of the ion trapping assembly when the first RF trapping waveform is applied.

The first RF trapping waveform may comprise a first RF trapping amplitude and the second RF trapping waveform comprises a second RF trapping amplitude, wherein the first RF trapping amplitude is greater than the second RF trapping amplitude.

The first RF trapping waveform may comprise a first RF trapping frequency and the second RF trapping waveform comprises a second RF trapping frequency, wherein the first RF trapping frequency is smaller than the second RF trapping frequency.

The invention claimed is:

1. A method of trapping ions in an ion trapping assembly, the method comprising:

(a) introducing ions into the ion trapping assembly, wherein the ion trapping assembly comprises an ion trap and an ion cooling device, (b) applying a first RF trapping amplitude to the ion trapping assembly, so as to trap introduced ions which have m/z ratios within a first range of m/z ratios;

(c) cooling the trapped ions;

(d) reducing the RF trapping amplitude from the first RF trapping amplitude to a second, lower, RF trapping amplitude so as to reduce the low mass cut-off of the ion trapping assembly; and (e) trapping, at the second, lower RF trapping amplitude, introduced ions having m/z ratios within a second range of m/z ratios;

wherein a lower mass limit of the second range of m/z ratios is below the low mass cut-off of the ion trapping assembly when the first RF trapping amplitude is applied, wherein in step (b), the first RF trapping amplitude is applied to the ion cooling device such that ions which have m/z ratios within the first range of m/z ratios are trapped in the ion cooling device;

wherein in step (c), the trapped ions are cooled in the ion cooling device;

wherein after step (c) and before step (d), the method comprises step (c)(i) comprising transferring the trapped ions from the ion cooling device to the ion trap whilst applying the first RF trapping amplitude to the ion cooling device and whilst applying a corresponding first RF trapping amplitude to the ion trap, such that the ion trap and the ion cooling device have the same low mass cut-off during the transfer of ions in step (c)(i), trapping, at the corresponding RF trapping amplitude, the transferred ions in the ion trap;

wherein in step (d), the RF trapping amplitude applied to the ion trap is reduced to the second, lower, RF trapping amplitude so as to reduce the low mass cut-off of the ion trap.

2. The method of claim 1, further comprising:

applying n further RF trapping amplitudes, each being intermediate the first and second RF trapping amplitudes, to the ion trap, wherein n>1, each of the n further RF trapping amplitudes causing introduced ions having a respective nth range of m/z ratios, each having lower mass limits, to be trapped;

the method further comprising cooling the introduced ions which are trapped at a relatively higher RF trapping amplitude before reducing the RF trapping amplitude to a relatively lower trapping amplitude.

3. The method of claim 2, wherein the first, the second, and/or each of the n further intermediate RF trapping amplitudes is applied for the same duration of time.

4. The method of claim 2, wherein at least some of the first, the second and/or each of the n further intermediate RF trapping amplitudes are applied for different times.

5. The method of claim 2, wherein the RF trapping amplitude is reduced continuously from the first to the second RF trapping amplitude so as to continuously reduce the low mass cut-off of the ion trapping assembly.

6. The method of claim 5, wherein the method comprises continuously cooling the trapped ions whilst continuously reducing the RF trapping amplitude.

7. The method of claim 1, wherein a total number of trapped ions in the ion trap is kept below a threshold determined as a function of the first and second RF trapping amplitudes.

8. The method of claim 1, wherein ions within a selected range of m/z ratios are introduced into the ion trapping assembly from an upstream ion device, wherein the upstream ion device transmits ions within a selected range of m/z ratios, the method further comprising:

adjusting the upstream ion device to reduce a lower mass limit of the selected range of m/z ratios; and reducing the RF trapping amplitude from the first RF trapping amplitude to the second, lower RF trapping amplitude in synchronism with the reduction of the lower mass limit of the selected range m/z ratios of the upstream ion device.

9. The method of claim 8, wherein the upstream ion device transmits ions within the first range of m/z ratios during step (a) such that the introduced ions of step (a) have m/z ratios within the first range of m/z ratios;

wherein the upstream ion device transmits ions within the second range of m/z ratios during step (e) such that step (e) further comprises introducing ions having m/z ratios within the second range of m/z ratios into the ion trapping assembly.

10. The method of claim 1, wherein the ion trapping assembly is an ion trap.

11. The method of claim 1, wherein the ion trap is a first ion trap and the ion cooling device is a second ion trap.

12. The method of claim 1, wherein in step (e), the ions which have m/z ratios within the second range of m/z ratios are trapped in the ion trap by the second RF trapping amplitude applied to the ion trap.

13. The method of claim 12, wherein in step (d) the RF trapping amplitude applied to the ion cooling device is reduced to a corresponding second RF trapping amplitude such that the ion trap and the ion cooling device have the same low mass cut-off during step (d).

14. The method of claim 1, wherein in step (d) the RF trapping amplitude applied to the ion cooling device is reduced to a corresponding second RF trapping amplitude such that the ion trap and the ion cooling device have the same low mass cut-off during step (d);

wherein in step (e), the ions within the range of m/z ratios are trapped in the ion cooling device by the corresponding second RF trapping amplitude applied to the ion cooling device;

wherein the method further comprises step (e)(i) comprising transferring the trapped ions within the second mass range from the ion cooling device to the ion trap whilst applying the corresponding second RF trapping amplitude to the ion cooling device and the second RF trapping amplitude to the ion trap and trapping, at the second RF trapping amplitude, the transferred ions having m/z ratios within the second range of m/z ratios in the ion trap.

15. The method of claim 14, wherein the method comprises applying n further RF trapping amplitudes, each being intermediate the first RF trapping amplitude and the second corresponding RF trapping amplitude, to the ion cooling device, wherein n>1, each of the n further RF trapping amplitudes causing introduced ions having a respective nth range of m/z ratios, each having lower mass limits, to be trapped in the ion cooling device; the method further comprising cooling the introduced ions which are trapped in the ion cooling device at a relatively higher RF trapping amplitude, transferring the trapped ions to the ion trap whilst applying the relatively higher RF trapping amplitude, trapping the transferred ions in the ion trap by applying the relatively higher RF trapping amplitude and cooling the trapped ions in the ion trap before reducing the RF trapping amplitude to a relatively lower trapping amplitude.

16. The method of claim 1, wherein the method further comprises cooling the ions having m/z ratios with in the first range of m/z ratios trapped in the ion trap before reducing the RF trapping amplitude applied to the ion trap.

17. The method of claim 10, wherein ions within a selected range of m/z ratios are introduced into the ion trapping assembly from an upstream ion device, wherein the upstream ion device transmits ions within a selected range of m/z ratios, the method further comprising:

adjusting the upstream ion device to reduce a lower mass limit of the selected range of m/z ratios; and reducing the RF trapping amplitude from the first RF trapping amplitude to the second, lower RF trapping amplitude in synchronism with the reduction of the lower mass limit of the selected range m/z ratios of the upstream ion device.

18. The method of claim 17, wherein the upstream ion device transmits ions within the first range of m/z ratios during step (a) such that the introduced ions of step (a) have m/z ratios within the first range of m/z ratios;

wherein the upstream ion device transmits ions within the second range of m/z ratios during step (e) such that step (e) further comprises introducing ions having m/z ratios within the second range of m/z ratios into the ion trapping assembly.

19. The method of claim 1, wherein the introduced ions of step (a) are introduced into the ion cooling device.

20. The method of claim 19, wherein the introduced ions of step (a) are introduced into the ion trap and transferred from the ion trap into the ion cooling device.

21. The method of claim 10, wherein step (e) comprises introducing ions into the ion trapping assembly, wherein the introduced ions of step (e) are introduced into the ion trap.

22. The method of claim 1, wherein step (e) comprises introducing ions into the ion trapping assembly, wherein the introduced ions of step (e) are introduced into the ion cooling device.

23. The method of claim 1, wherein the ion cooling device has a different pressure than the ion trap.

24. The method of claim 13, wherein the ion cooling device has a higher pressure than the ion trap.

25. The method of claim 1, wherein the ion cooling device is a fragmentation cell.

26. The method of claim 1, wherein the corresponding first RF trapping amplitude is the same as the first RF trapping amplitude.

27. The method of claim 13, wherein the corresponding second RF trapping amplitude is the same as the second RF trapping amplitude.

28. A controller for controlling trapping of ions in an ion trapping assembly, the ion trapping assembly having an electrode assembly, the controller being configured:

to cause ions to be introduced into the ion trapping assembly, wherein the ion trapping assembly comprises an ion trap and an ion cooling device;

to apply a first RF trapping amplitude to the electrode assembly, so as to trap introduced ions which have m/z ratios within a first range of m/z ratios, for a duration sufficient to allow cooling of the ion trapped introduced ions, wherein the first RF trapping amplitude is applied to the ion cooling device such that ions which have m/z ratios within the first range of m/z ratios are trapped in the ion cooling device and cooled;

to transfer the trapped ions from the ion cooling device to the ion trap whilst applying the first RF trapping amplitude to the ion cooling device and whilst applying a corresponding first RF trapping amplitude to the ion trap, such that the ion trap and the ion cooling device have the same low mass cut-off during the transfer of ions, trapping, at the corresponding RF trapping amplitude, the transferred ions in the ion trap;

to reduce the RF trapping amplitude applied to the electrode assembly from the first RF trapping amplitude to a second, lower, RF trapping amplitude which traps introduced ions having m/z ratios within a second range of m/z ratios, wherein the RF trapping amplitude applied to the ion trap is reduced to the second, lower, RF trapping amplitude so as to reduce the low mass cut-off of the ion trap, wherein a lower mass limit of the second range of m/z ratios is below the low mass cut-off of the ion trapping assembly when the first RF trapping amplitude is applied.

29. The controller of claim 28, wherein the ion trapping assembly is an ion trap.

30. The controller of claim 28, wherein the controller is further configured to apply n further RF trapping amplitudes, each being intermediate the first and second RF trapping amplitudes, to the ion trapping assembly, wherein n>1, each of the n further RF trapping amplitudes causing introduced ions having a respective nth range of m/z ratios, each having lower mass limits, to be trapped, the or each n further RF trapping amplitudes being applied for a duration sufficient to allow cooling of the ions trapped at that nth RF trapping amplitude.

31. The controller of claim 28, wherein the ion trapping assembly comprises an ion trap and an ion cooling device, the ion trap and the ion cooling device each having an electrode assembly, the controller being configured:

to cause ions to be introduced to the ion trap from an upstream ion device that transmits ions within a selected range of m/z ratios, to cause ions which have m/z ratios within a first range of m/z ratios to be introduced into the ion cooling device, to apply the first RF trapping amplitude to the electrode assembly of the ion cooling device, so as to trap introduced ions which have m/z ratios within the first range of m/z ratios, to transfer trapped ions from the ion cooling device to the ion trap while applying the first RF trapping amplitude to the electrode arrangements of the ion cooling device and the ion trap, to apply the first RF trapping amplitude to the electrode arrangement of the ion trap for a duration sufficient to allow cooling of the trapped ions;

to reduce the RF trapping amplitude applied to the electrode arrangement of the ion trap from the first RF trapping amplitude to a second, lower, RF trapping amplitude; and either to cause ions which have m/z ratios within a second range of m/z ratios to be introduced and trapped in the ion cooling device by applying the second, lower, RF trapping amplitude to the electrode arrangement of the ion cooling device;

or to cause ions which have m/z ratios within a second range of m/z ratios to be introduced and trapped in the ion trap by applying the second, lower, RF trapping amplitude to the electrode arrangement of the ion trap.

32. The controller of claim 31, wherein, if the controller is configured to cause ions which have m/z ratios within a second range of m/z ratios to be introduced and trapped in the ion cooling device by applying the second, lower, RF trapping amplitude to the electrode arrangement of the ion cooling device, then the controller is also configured to cause transfer of the ions which have m/z ratios within the second range of m/z ratios from the ion cooling device to the ion trap while applying the second RF trapping amplitude to the ion cooling device and to the ion trap.

33. The controller of any one of claim 32, wherein the controller is further configured to continuously reduce the RF trapping amplitude applied to the electrode assembly whilst continuously cooling the trapped ions.

*34. A method of trapping ions in an ion trapping assembly, the method comprising:*

*(a) introducing ions into the ion trapping assembly, wherein the ion trapping assembly comprises an ion trap,*

*(b) applying a first RF trapping amplitude to the ion trapping assembly, so as to trap introduced ions which have m/z ratios within a first range of m/z ratios;*

*(c) cooling the trapped ions;*

*(d) reducing the RF trapping amplitude from the first RF trapping amplitude to a second, lower, RF trapping amplitude so as to reduce the low mass cut-off of the ion trapping assembly; and*

*(e) trapping, at the second, lower RF trapping amplitude, introduced ions having m/z ratios within a second range of m/z ratios;*

*wherein a lower mass limit of the second range of m/z ratios is below the low mass cut-off of the ion trapping assembly when the first RF trapping amplitude is applied,*

*further comprising transferring trapped ions from an upstream ion device to the ion trapping assembly whilst applying the first RF trapping amplitude to the ion trapping assembly, such that the ion trapping assembly and the upstream ion device have the same low mass cut-off during the transfer of ions, trapping, at the corresponding RF trapping amplitude, the transferred ions in the ion trapping assembly;*

*wherein in step (d), the RF trapping amplitude applied to the ion trap is reduced to the second, lower, RF trapping amplitude so as to reduce the low mass cut-off of the ion trap; and*

*wherein a total number of trapped ions in the ion trapping assembly is kept below a threshold determined as a function of the first and second RF trapping amplitudes.*

*35. The method of claim 34, further comprising:*

*applying n further RF trapping amplitudes, each being intermediate the first and second RF trapping amplitudes, to the ion trapping assembly, wherein n≥1, each of the n further RF trapping amplitudes causing introduced ions having a respective nth range of m/z ratios, each having lower mass limits, to be trapped;*

*the method further comprising cooling the introduced ions which are trapped at a relatively higher RF trapping amplitude before reducing the RF trapping amplitude to a relatively lower trapping amplitude.*

*36. The method of claim 35, wherein the first, the second, and/or each of the n further intermediate RF trapping amplitudes is applied for the same duration of time or wherein at least some of the first, the second and/or each of the n further intermediate RF trapping amplitudes are applied for different times.*

*37. The method of claim 35, wherein the RF trapping amplitude is reduced continuously from the first to the second RF trapping amplitude so as to continuously reduce the low mass cut-off of the ion trapping assembly.*

*38. The method of claim 37, wherein the method comprises continuously cooling the trapped ions whilst continuously reducing the RF trapping amplitude.*

*39. The method of claim 34, wherein the trapped ions from the upstream ion device are within a selected range of m/z ratios, wherein the upstream ion device transmits ions within the selected range of m/z ratios, the method further comprising:*

*adjusting the upstream ion device to reduce a lower mass limit of the selected range of m/z ratios; and*

*reducing the RF trapping amplitude from the first RF trapping amplitude to the second, lower RF trapping amplitude in synchronism with the reduction of the lower mass limit of the selected range m/z ratios of the upstream ion device.*

*40. The method of claim 34, wherein the ion trapping assembly further comprises an ion cooling device.*

*41. The method of claim 40, wherein the introduced ions of step (a) are introduced into the ion cooling device.*

42. The method of claim 40, wherein step (e) comprises introducing ions into the ion trapping assembly, wherein the introduced ions of step (e) are introduced into the ion trap.

43. The method of claim 40, wherein the ion cooling device has a different pressure than the ion trap, wherein the ion cooling device has a higher pressure than the ion trap.

44. The method of claim 40, wherein the ion trap and/or ion cooling device are configured to fragment ions.

45. The method of claim 34, wherein the lower mass limit of the second range of m/z ratios is less than the lower mass limit of the first range of m/z ratios.

46. The method of claim 34, wherein the lower mass limit of the first range of m/z ratios is greater than an upper mass limit of the second range of m/z ratios, such that the first range of m/z ratios and the second range of m/z ratios do not overlap.

47. A method of trapping ions in an ion trapping assembly, the method comprising:

(a) introducing ions into the ion trapping assembly, wherein the ion trapping assembly comprises an ion trap;

(b) applying a first RF trapping frequency to the ion trapping assembly so as to trap introduced ions which have m/z ratios within a first range of m/z ratios;

(c) cooling the trapped ions;

(d) increasing the RF trapping frequency from the first RF trapping frequency to a second RF trapping frequency so as to reduce the low mass cut-off of the ion trapping assembly; and (e) trapping, at the second RF trapping frequency, introduced ions having m/z ratios within a second range of m/z ratios;

wherein a lower mass limit of the second range of m/z ratios is below the low mass cut-off of the ion trapping assembly when the first RF trapping frequency is applied, further comprising transferring trapped ions from an upstream ion device to the ion trapping assembly whilst applying the first RF trapping frequency to the ion trapping assembly, such that the ion trapping assembly and the upstream ion device have the same low mass cut-off during the transfer of ions, trapping, at the corresponding RF trapping frequency, the transferred ions in the ion trapping assembly;

wherein in step (d), the RF trapping frequency applied to the ion trap is increased to the second RF trapping frequency so as to reduce the low mass cut-off of the ion trap; and wherein a total number of trapped ions in the ion trapping assembly is kept below a threshold determined as a function of the first and second RF trapping frequencies.

48. A method of trapping ions in an ion trapping assembly, wherein the ion trapping assembly is configured to fragment ions, the method comprising:

(a) introducing precursor ions into the ion trapping assembly, wherein the ion trapping assembly comprises an ion trap, (b) fragmenting the introduced precursor ions to generate product ions;

(c) applying a first RF trapping amplitude to the ion trapping assembly, so as to trap product ions which have m/z ratios within a first range of m/z ratios;

(d) cooling the trapped product ions;

(e) reducing the RF trapping amplitude from the first RF trapping amplitude to a second, lower, RF trapping amplitude so as to reduce the low mass cut-off of the ion trapping assembly; and (f) trapping, at the second, lower RF trapping amplitude, product ions having m/z ratios within a second range of m/z ratios;

wherein a lower mass limit of the second range of m/z ratios is below the low mass cut-off of the ion trapping assembly when the first RF trapping amplitude is applied;

further comprising transferring trapped ions from an upstream ion device to the ion trapping assembly whilst applying the first RF trapping amplitude to the ion trapping assembly, such that the ion trapping assembly and the upstream ion device have the same low mass cut-off during the transfer of ions, trapping, at the corresponding RF trapping amplitude, the transferred ions in the ion trapping assembly;

wherein in step (e), the RF trapping amplitude applied to the ion trap is reduced to the second, lower, RF trapping amplitude so as to reduce the low mass cut-off of the ion trap; and wherein a total number of trapped ions in the ion trapping assembly is kept below a threshold determined as a function of the first and second RF trapping amplitudes.

49. The method of claim 48, wherein the ion trapping assembly is an ion trap, and wherein the method further comprises:

(g) transferring trapped product ions of the first and second range of m/z ratios to a further ion trap, wherein the further ion trap has a different pressure to the ion trap configured to fragment ions, wherein the further ion trap is held at lower pressure than the ion trap configured to fragment ions, further wherein the ions are transferred to the further ion trap while the second, lower RF trapping amplitude is applied.

50. A controller for controlling trapping of ions in an ion trapping assembly, the ion trapping assembly having an electrode assembly, the controller being configured:

to cause ions to be introduced into the ion trapping assembly, wherein the ion trapping assembly comprises an ion trap;

to apply a first RF trapping amplitude to the electrode assembly, so as to trap introduced ions which have m/z ratios within a first range of m/z ratios, for a duration sufficient to allow cooling of the trapped introduced ions;

to reduce the RF trapping amplitude applied to the electrode assembly from the first RF trapping amplitude to a second, lower, RF trapping amplitude which traps introduced ions having m/z ratios within a second range of m/z ratios, wherein the RF trapping amplitude applied to the ion trap is reduced to the second, lower, RF trapping amplitude so as to reduce the low mass cut-off of the ion trap, to transfer trapped ions from an upstream ion device to the ion trapping assembly whilst applying the first RF trapping amplitude to the ion trapping assembly, such that the ion trapping assembly and the upstream ion device have the same low mass cut-off during the transfer of ions, trapping, at the corresponding RF trapping amplitude, the transferred ions in the ion trapping assembly;

*wherein a lower mass limit of the second range of m/z ratios is below the low mass cut-off of the ion trapping assembly when the first RF trapping amplitude is applied,*

*wherein the controller is configured to determine a threshold for total number of trapped ions within the ion trapping assembly as a function of the first and second RF trapping amplitudes,*

*further wherein the controller is configured to control application of the first and second RF trapping amplitudes such that a total number of trapped ions in the ion trapping assembly is kept below the threshold.*

*51. The controller of claim 50, wherein the controller is further configured to apply n further RF trapping amplitudes, each being intermediate the first and second RF trapping amplitudes, to the ion trapping assembly, wherein n≥1, each of the n further RF trapping amplitudes causing introduced ions having a respective nth range of m/z ratios, each having lower mass limits, to be trapped, the or each n further RF trapping amplitudes being applied for a duration sufficient to allow cooling of the ions trapped at that nth RF trapping amplitude.*

*52. An ion trapping assembly comprising:*

*an electrode assembly; and*

*the controller of claim 50.*

*53. A mass spectrometer comprising:*

*an ion source configured to generate ions;*

*an ion trapping assembly configured to receive the ions generated by the ion source; and*

*the controller according to claim 50.*

* * * * *